US006630946B2

United States Patent
Elliott et al.

(10) Patent No.: US 6,630,946 B2
(45) Date of Patent: *Oct. 7, 2003

(54) METHODS FOR AUTOMATICALLY LOCATING DATA-CONTAINING WINDOWS IN FROZEN APPLICATIONS PROGRAM AND SAVING CONTENTS

(75) Inventors: Scott C. Elliott, Hillsboro, OR (US); K. Jeffrey Percy Carr, Tigard, OR (US)

(73) Assignee: Symantec Corporation, Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,076

(22) Filed: Nov. 10, 1999

(65) Prior Publication Data

US 2002/0169795 A1 Nov. 14, 2002

(51) Int. Cl.[7] .............................. G06F 3/00; G06F 12/00
(52) U.S. Cl. ....................... 345/781; 345/803; 345/806; 345/853; 707/202; 711/161
(58) Field of Search ................................ 345/326, 339, 345/340, 356, 700, 764, 781, 853, 803, 806; 707/202–204; 709/313, 316, 317, 328; 711/161–162

(56) References Cited

U.S. PATENT DOCUMENTS

| 4,514,846 A | 4/1985 | Federico et al. ............... 714/45 |
| 4,521,847 A | 6/1985 | Ziehm et al. .................. 700/79 |
| 4,580,232 A | 4/1986 | Dugan et al. .................. 399/77 |
| 4,589,090 A | 5/1986 | Downing et al. ............. 714/10 |
| 4,811,216 A | 3/1989 | Bishop et al. ............... 711/153 |
| 4,827,406 A | 5/1989 | Bischoff et al. ............. 711/153 |
| 4,870,644 A | 9/1989 | Sherry et al. ................. 714/47 |
| 5,008,853 A | 4/1991 | Bly et al. ..................... 345/751 |
| 5,040,178 A | 8/1991 | Lindsay et al. ............. 714/722 |
| 5,124,989 A | 6/1992 | Padawer et al. .............. 714/38 |
| 5,276,860 A * | 1/1994 | Fortier et al. .................. 714/6 |
| 5,287,501 A * | 2/1994 | Lomet ........................ 707/202 |
| 5,293,612 A * | 3/1994 | Shingai ....................... 711/159 |

(List continued on next page.)

OTHER PUBLICATIONS

Alan Simpson, "Mastering WordPerfect 5.1 & 5.2 for Windows", SYBEX, 1994, pp. 407, 453–455.*
Margaret Levine Young et al, "WordPerfect 6.1 for Windows for Dummies", IDG Books Worldwide Inc., 2nd Edition, 1993, pp. 335, 368.*

(List continued on next page.)

Primary Examiner—John Cabeca
Assistant Examiner—X. L. Bautista
(74) Attorney, Agent, or Firm—Fliesler Dubb Meyer & Lovejoy, LLP

(57) ABSTRACT

A machine-automated system tries to save vital-data of a crashed or otherwise frozen application program by: (a) attempting to revive a program that has apparently become frozen; (b) identifying the apparently-frozen program; (c) identifying one or more windows within the identified program that are most likely to immediately contain data which the user is likely to consider as vital and in need of saving; (d) sending one or both of a SAVE and a CLOSE command message to each of the identified one or more windows so as to thereby cause that window to itself save its vital data contents and to thereafter gracefully close itself. A profiling database may be constructed for helping to identify the vital data-containing windows of both popular (well known) and obscure application programs. One such profiling database has ID records which define parent/child hierarchy relationships between vital data-containing windows and other windows of various application programs.

26 Claims, 7 Drawing Sheets

U.S. PATENT DOCUMENTS

| | | | | |
|---|---|---|---|---|
| 5,321,824 A | * | 6/1994 | Burke et al. | 711/220 |
| 5,335,344 A | | 8/1994 | Hastings | 714/35 |
| 5,410,685 A | | 4/1995 | Banda et al. | 714/38 |
| 5,493,649 A | * | 2/1996 | Slivka et al. | 714/48 |
| 5,515,493 A | | 5/1996 | Boston et al. | 345/807 |
| 5,526,485 A | | 6/1996 | Brodsky | 714/38 |
| 5,530,864 A | * | 6/1996 | Matheny et al. | 709/328 X |
| 5,559,980 A | | 9/1996 | Connors et al. | 711/100 |
| 5,561,786 A | | 10/1996 | Morse | 711/170 |
| 5,568,635 A | | 10/1996 | Yamaguchi | 711/171 |
| 5,581,696 A | | 12/1996 | Kolawa et al. | 714/38 |
| 5,581,697 A | | 12/1996 | Gramlich et al. | 714/35 |
| 5,696,897 A | | 12/1997 | Dong | 714/15 |
| 5,701,484 A | * | 12/1997 | Artsy | 709/316 |
| 5,712,971 A | | 1/1998 | Stanfill et al. | 714/34 |
| 5,748,882 A | | 5/1998 | Huang | 714/47 |
| 5,812,848 A | | 9/1998 | Cohen | 709/331 |
| 5,815,702 A | | 9/1998 | Kannan et al. | 712/244 |
| 5,819,022 A | | 10/1998 | Bandat | 714/16 |
| 5,857,204 A | * | 1/1999 | Lordi et al. | 707/202 |
| 5,857,207 A | * | 1/1999 | Lo et al. | 707/203 |
| 5,911,060 A | | 6/1999 | Elliott | 709/100 |
| 5,938,775 A | | 8/1999 | Damani et al. | 714/15 |
| 5,974,249 A | | 10/1999 | Elliott et al. | 703/27 |
| 6,009,258 A | | 12/1999 | Elliott | 703/22 |
| 6,009,414 A | * | 12/1999 | Hoshiya et al. | 705/30 |
| 6,044,475 A | | 3/2000 | Chung et al. | 714/15 |
| 6,151,569 A | * | 11/2000 | Elliott | 703/22 |
| 6,173,291 B1 | * | 1/2001 | Jenevein | 707/202 X |
| 6,182,243 B1 | | 1/2001 | Berthe et al. | 714/38 |
| 6,269,478 B1 | | 7/2001 | Lautenbach-Lampe et al. | 717/127 |
| 6,330,528 B1 | | 12/2001 | Huang et al. | 703/22 |
| 6,389,556 B1 | | 5/2002 | Qureshi | 714/15 |
| 6,405,325 B1 | | 6/2002 | Lin et al. | 714/15 |
| 6,438,709 B2 | | 8/2002 | Poisner | 714/23 |
| 6,438,749 B1 | | 8/2002 | Chamberlain | 717/174 |

OTHER PUBLICATIONS

Larry Brown et al, "Dynamic Snooping in a Fault–Tolerant Distributed Shared Memory," IEEE, pp. 218–226.*

"First Aid® 97 Deluxe, User Manual," CyberMedia, Inc., 1996, pp. i–viii, 1–123.

"Vertisoft Fix–It™ For Windows 95," User's Guide, Vertisoft System, Inc., Jun. 1996, pp. i–vii, 1–86.

"WINProbe 95™ User Guide," Quarterdeck Corp., 1996, pp. i–vi, 1–88.

Adaptec, Inc.; GoBack: Product Tour—viewing your drive as it was in the past; http://www.adaptec.com/products/tour/goback4.html; Oct. 16, 2000; pp. 1–2.

Adaptec, Inc.; GoBack Product Reviews; http://adaptec.com/products/overview/gobackreviews.html; Jul. 21, 2000; pp. 1–5.

Adaptec, Inc.; What GoBack Users are Saying; http://www.adaptec.com/adaptec/testimonials/goback.html; Jul. 21, 2000; pp. 1–3.

Adaptec, Inc.; GoBack Product Awards; http://www.adaptec.com/products/overview/gobackawards.html; Jul. 21, 2000; pp. 1–3.

Adaptec, Inc.; ReZOOM Multimedia Presentations; http://www.adaptec.com/products/tour/rezoom_m.htnl; Jul. 21, 2000 p. 1.

Adaptec, Inc.; GoBack: The Power to Undo PC Problems—product overview; http://www.adaptec.com/products/overview/goback.html; Jul. 21, 2000; pp. 1–3.

Adaptec, Inc.; GoBack: The Power to Undo PC Problems—data sheet; http://www.adaptec.com/products/datasheets/goback.html; Jul. 21, 2000; pp. 1–3.

Adaptec, Inc.; GoBack: The Power to Undo PC Problems on Shared or Workgroup Computers—data sheet; http://www.adaptec.com/products/datasheets/gobackprofessional.html; Jul. 21, 2000; pp. 1–3.

Adaptec, Inc.; GoBack: Product Tour—introducing GoBack; http://www.adaptec.com/products/tour/goback.html; Oct. 16, 2000; pp. 1–2.

Adaptec, Inc.; GoBack: Product Tour—restoring the system, step 1; http://www.adaptec.com/products/tour/goback1a.html; Oct. 16, 2000; pp. 1–2.

Adaptec, Inc.; GoBack: Product Tour—restoring the system, step 2; http://www.adaptec.com/products/tour/goback1b.html; Oct. 16, 2000; pp. 1–3.

Adaptec, Inc.; GoBack: Product Tour—recovering an overwritten file, step 1; http://www.adaptec.com/products/tour/goback2a.html; Oct. 16, 2000; pp. 1–2.

Adaptec, Inc.; GoBack: Product Tour—recovering an overwritten file, step 2; http://www.adaptec.com/products/tour/goback2b.html; Oct. 16, 2000; pp. 1–2.

Adaptec, Inc.; GoBack: Product Tour—recovering a deleted file; http://adaptec.com/products/tour/goback3.html; Oct. 16, 2000; p. 1.

Adaptec, Inc.; ReZOOM: Technology Comparison; http://adaptec.com/technology/overview/rezoom.html; Jul. 21, 2000; pp. 1–5.

Adaptec, Inc.; ReZOOM Compatibility Update; http://www.adaptec.com/support/compatibility/rezoom.html; Jul. 21, 2000; pp. 1–2.

Adaptec, Inc.; ReZOOM: Product Tour—Setup ReZOOM; http://www.adaptec.com/products/tour/rezoom1.html; Oct. 16, 2000; pp. 1–3.

Adaptec, Inc.; What resellers are saying about ReZOOm; http://www.adaptec.com/adaptec/testimonials/rezoom.html; Jul. 21, 2000; pp. 1–2.

Adaptec, Inc.; ReZOOM: All–In–One Protection To Eliminate PC Downtime—product overview; http://www.adaptec.com/products/overview/rezoom.html; Jul. 21, 2000; pp. 1–3.

Adaptec, Inc.; ReZOOM: All–in–one Protection to Eliminate PC Downtime—ReZOOM Features; http://www.adaptec.com/products/overview/rezoomfeatures.html; Jul. 21, 2000; pp. 1–4.

Adaptec, Inc.; ReZOOM: All–In–One Protection To Eliminate PC Downtime—data sheet; http://www.adaptec.com/products/datasheets/rezoom.html; Jul. 21, 2000; pp. 1–4.

Adaptec, Inc.; ReZOOM Product FAQs; http://www.adaptec.com/products/faqs/rezoom.html; Jul. 21, 2000; pp. 1–5.

Adaptec, Inc.; ReZOOM: Product Tour—Setup ReZOOM, cont.; http://www.adaptec.com/products/tour/rezoom1b.html; Oct. 16, 2000; pp. 1–3.

Adaptec, Inc.; ReZOOM: Product Tour—Testing Recovery; http://www.adaptec.com/products/rezoom2.html; Oct. 16, 2000; pp. 1–2.

Adaptec, Inc.; ReZOOM: Product Tour—Using ReZOOM; http://www.adaptec.com/products/tour/rezoom3.html; Oct. 16, 2000; pp. 1–3.

Adaptec, Inc.; ReZOOM: Product Tour—ReZOOM Recovery; http://www.adaptec.com/products/tour/rezoom4.html; Oct. 16, 2000; pp. 1–3.

Pietrek, M., "Windows ™ 95 System Programming Secrets™," IDG Books Worldwide, Inc., 1995, pp. 692–694.

Richter, J., "Advanced Windows™, The Developer's Guide to the WIN 32® API for Windows NT™ 3,5 and Windows 95," Microsoft Press, Copyright 1995, pp. 809–838, 848–858.

U.S. patent application Ser. No. 09/438,135, Lopez et al., filed Nov. 10, 1999.

U.S. patent appliction Ser. No. 09/438,020, Zeigler et al., filed Nov. 10, 1999.

* cited by examiner

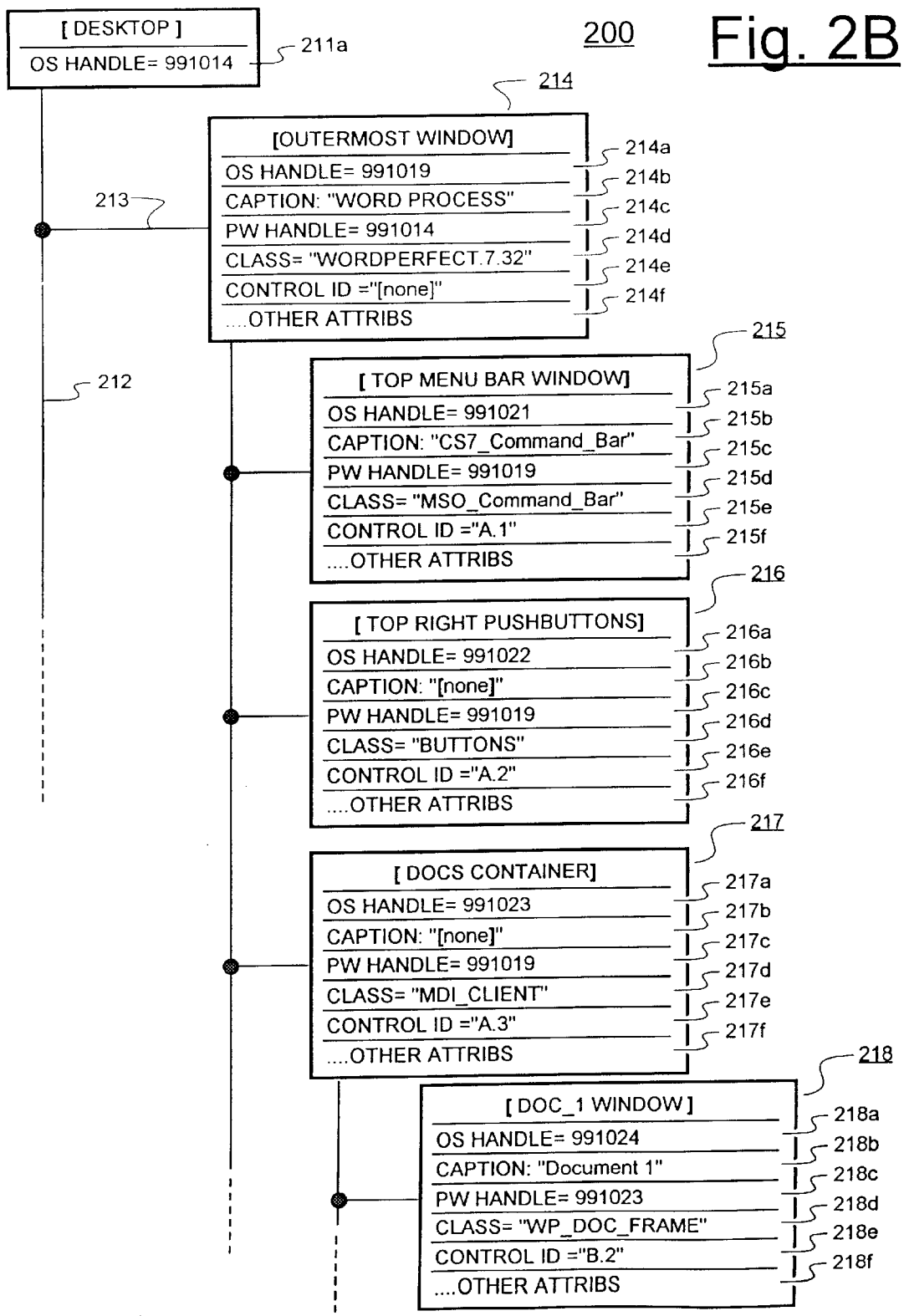

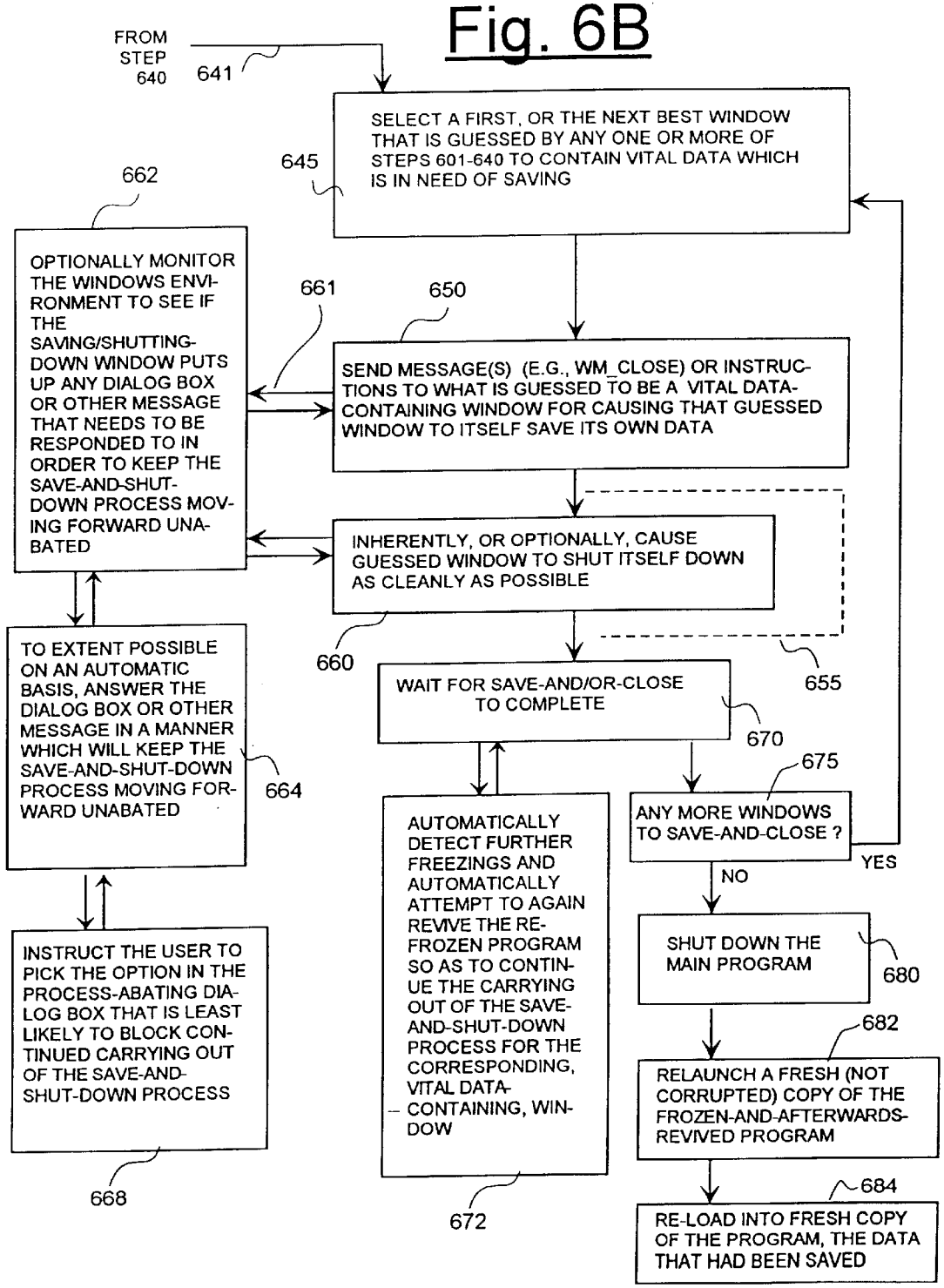

METHODS FOR AUTOMATICALLY LOCATING DATA-CONTAINING WINDOWS IN FROZEN APPLICATIONS PROGRAM AND SAVING CONTENTS

BACKGROUND

1. Field of the Invention

The invention relates generally to computer systems that concurrently execute plural application programs on a preemptive multitasking basis.

The invention is directed more specifically to multitasking systems wherein the execution of a given application program may become frozen or may otherwise halt unexpectedly and for which it is desirable revive the frozen/-halted application program at least partially so as to enable nonvolatile saving of work product produced so far by the frozen program. The invention is directed even more specifically to the problem of how to appropriately save work product items of a just-revived application program.

2a. Cross Reference to Related Patents

The disclosures of the following U.S. patents are incorporated herein by reference:

(A) U.S. Pat. No. 5,911,060 issued Jun. 8, 1999 to Scott Elliott, and entitled, COMPUTER METHOD AND APPARATUS FOR UNFREEZING AN APPARENTLY FROZEN APPLICATION PROGRAM BEING EXECUTED UNDER CONTROL OF AN OPERATING SYSTEM; and (B) U.S. Pat. No. 5,974,249 issued Oct. 26, 1999 to Scott Elliott et al, and entitled, ZERO FOOTPRINT METHOD AND APPARATUS FOR EXPANDING ALLOCATED MEMORY SPACE OF A PROCESS USING A VIRTUAL MEMORY AREA.

2b. Cross Reference to Co-Pending Patent Applications

The disclosures of the following Co-pending, U.S. patent applications (each owned by the owner of the present application) are incorporated herein by reference:

(A) U.S. Ser. No. 08/938,204, filed Sep. 26, 1997, by inventor Scott Elliott and originally entitled COMPUTER METHOD AND APPARATUS FOR ACCESSING AN APPLICATION PROGRAM WHICH HAS BECOME UNRESPONSIVE TO MESSAGES FROM THE OPERATING SYSTEM OR INCURRED A FATAL ERROR, which application later issued as U.S. Pat. No. 6,009,258; and (B) U.S. Ser. No. 09/275,171, filed Mar. 24, 1999 as a divisional of U.S. Ser. No. 08/937,629, filed Sep. 26, 1997 by inventor Scott Elliott and originally entitled COMPUTER METHOD AND APPARATUS FOR UNFREEZING AN APPARENTLY FROZEN APPLICATION PROGRAM BEING EXECUTED UNDER CONTROL OF AN OPERATING SYSTEM.

2c. Copyright Notice

This application includes one or more listings of computer programs. The assignee of the present application claims certain copyrights in said computer program listings. The assignee has no objection, however, to the reproduction by others of these listings if such reproduction is for the sole purpose of studying it to understand the invention. The assignee reserves all other copyrights in said program listings including the right to reproduce the corresponding computer programs in machine executable form.

3. Description of Related Art

Multitasking computer systems may be characterized as those that allow multiple programs to execute in overlapping fashion so that it appears the programs are all running at the same time.

Preemptive multitasking systems may be characterized as those in which an operating system (OS) has supervisory control over the concurrently executing programs and the OS limits the length of time that each given application program has for using system resources such as a CPU (Central Processing Unit) or other data processing means.

Examples of preemptive multitasking OS's include Microsoft Windows95™, Microsoft Windows98™ and Microsoft Windows NT™, all of which are available from Microsoft Corporation of Redmond, Wash. These OS's also permit multi-threaded execution of programs. In multi-threaded execution, a program begins executing as a first, main thread and optionally generates ancillary threads that run concurrently and interact with one another through exchanges of semaphores.

During execution, a given application program may encounter an unexpected problem which halts its normal execution either in a main thread or an ancillary thread. Examples of causes for such problems include those in which: (a) the program attempts to access restricted (privileged) or unavailable areas of memory areas, (b) the program makes calls to unavailable system functions or services without the ability to handle such unavailability, (c) the program jumps into a nonsense stream of execution code, (d) the program invokes a no-time-out wait for an event that never happens, (e) the program enters into a deadlock embrace, and so forth. This is a nonexhaustive list of possible causes.

When such execution-halting events occur, artisans sometimes refer to the halted program as being 'stuck' or 'frozen' or 'crashed' or as having encountered a 'fatal error'. Different flavors of these terms are sometimes associated to one class of cause as opposed to another. Here, the terminology 'frozen application' will be generically applied to any and all situations in which the user of a given application program reasonably believes the program is stuck and therefore prevents saving of work product irrespective of the exact cause and irrespective of whether that belief is accurate in fact.

The end-user (e.g., novice user) of a computer system typically doesn't care what the specific cause is that has led him or her to believe that they can no longer save work product. Such a user instead generally recognizes the 'frozen' condition as an apparently sudden refusal by the given application program to respond appropriately to keyboard strokes or to mouse clicks or to other user interface interactions (which interactions can include voice commands, hand gestures, and so forth).

The presence of a frozen program does not generally pose a major problem to the overall operations of a preemptive multitasking system. In such systems, other, concurrently-executing application programs can continue to run in normal fashion even though a given application has actually become frozen or has actually crashed (as opposed to situations where the program is fine and the user merely believes it has become stuck). The end-user continues to have access to operating system services and to the resources of non-frozen application programs. (For example, in a Windows95/98™ environment the user may hit the Alt-Tab key combination to switch to the next task.) The user may choose to simply end the tasking of the apparently-frozen program and to thereafter restart the program afresh from its basic start-up state.

Sometimes, this close-and-restart_afresh option is not an attractive one for the end-user. It may be that the end-user did not, or believes he did not, save to nonvolatile memory (e.g., to hard disk), a segment of work that he/she last performed with the application just before the given application became frozen. Closing-and-restarting the frozen program afresh may mean that the unsaved work may be lost forever. Many hours of work may have to be painfully redone to reconstruct the state of the application just before it apparently became frozen. In some instances, the pre-freeze state of the application may represent non-replicatable work product such as data that had just been captured and/or transformed in real-time.

To remedy this predicament, various un-freezing techniques have been developed. These try to revive the frozen/crashed program at least to a sufficient level such that unsaved work product may be accessed and saved either wholly or partially. Examples of such un-freezing techniques include those disclosed in the above-cited patents and patent applications.

No currently known revival technique is 100% effective for all possible forms of application program. One may make an analogy to attempts to revive a human patient by CPR (cardio-pulmonary resuscitation) after the patient suffers a cardiac arrest. In some cases, the patient is fully revived. In other cases, the patient is revived but still suffers from serious complications. And in yet further cases, even heroic attempts to revive the patient regretfully prove unsuccessful. In so far as reviving a frozen application program is concerned, the end goal is not to keep the application program alive and working as long as possible, but rather to keep it alive long enough so that vital, but still unsaved, work product can be saved.

One un-freezing technique tests the apparently-frozen application to see if the cause of the freeze is a 'soft event' (where the application continues to respond to messages from the OS) or a 'hard event' (where the application is not longer responding to messages from the OS). If it is a 'soft event', the un-freezing technique may try to CLOSE or CANCEL the currently 'active' window under the theory that such an 'active' window is simply a hidden dialog box that is expecting a user response, but is not getting it because the user does not see the hidden dialog box.

If the cause of the freeze is determined to be a 'hard event', the un-freezing technique may try to continue the execution of the frozen application program by entering the execution stream of the frozen program at a point where continued execution will probably preserve the application's state just before the encounter with the freeze-causing event. However, even if this attempt is fully or partially successful, determining specifically what data within the revived program should be saved and exactly how to go about saving it is still a problem.

Conventionally, after a revival technique is applied to a 'hard' failure event, a message is sent to the user to go ahead and try to immediately save their work product to nonvolatile memory and to then immediately shut down the application program. In some instances, the end user finds that these instructions are very easy to follow. The application program appears to be fully resuscitated and the end user may quickly forget that the program just suffered a serious problem. The user may be able to easily maneuver the cursor to a SAVE FILE function on the program's menu bar and invoke a file saving operation. Sometimes the user may be so lucky as to be able to continue working as if nothing wrong had just happened, although such continuing of work defies the instructions given to the user.

In other cases, the end user's ability to follow the post-revival instructions turns out to be more complicated. The end user may find that the mouse-driven SAVE FILE function of the program has become inoperative. The user may not know what else to do for saving the work product data. Also, the user may have multiple spreadsheets or multiple other work product objects (e.g., word processor documents) left open and in need of saving. The user may become confused and try to use inoperative parts of the just-revived program instead of immediately saving all unsaved work product.

The present invention provides methods and systems which may be used as automated alternatives to allowing an end user to manually control the work product saving process in a just-revived program.

SUMMARY OF THE INVENTION

A number of separate aspects of a multi-threading, windows-oriented operating system (OS) are employed here. These include: detection of a possible freeze and attempted revival of an apparently-frozen program, analysis of the parent/child windows hierarchy in the just-revived program, and automatically passing of messages to appropriate child windows to cause those windows to themselves save their data contents and/or immediately thereafter close.

When an un-freeze request is presented, and a Vital Save™ option is selected (VitalSave™ is a trademark of Symantec Corp.), an appropriate revival procedure (which could include doing nothing) is automatically selected and carried out. Thereafter, an automatic identification is made of one or more windows of the just-revived program that most probably contain (immediately in such identified windows), vital data that the user would most likely want to save. One or both of a SAVE and CLOSE message is automatically sent to each identified one of the vital-data containing windows so as to cause that window to itself save its own vital-data, and thereafter optionally close itself.

A machine-implemented, vital-data saving method in accordance with the invention comprises the steps of: (a) attempting to revive a program that has apparently become frozen and identifying that apparently-frozen program; (b) identifying one or more windows within the identified program that are most likely to immediately contain therein data which the user is likely to consider as vital and in need of saving; (c) sending one or both of a SAVE and a CLOSE command message to each of the identified one or more windows so as to thereby cause that window to itself save its vital data contents and to thereafter optionally close itself.

Other features and aspects of the invention will become apparent from the below detailed description.

BRIEF DESCRIPTION OF THE DRAWINGS

The below detailed description makes reference to the accompanying drawings, in which:

FIG. 2B is an example of a windows hierarchy chart;

FIGS. 6A–6B combine to define a flow chart showing broader aspects of a vital save operation in accordance with the invention.

DETAILED DESCRIPTION

Figure 1:
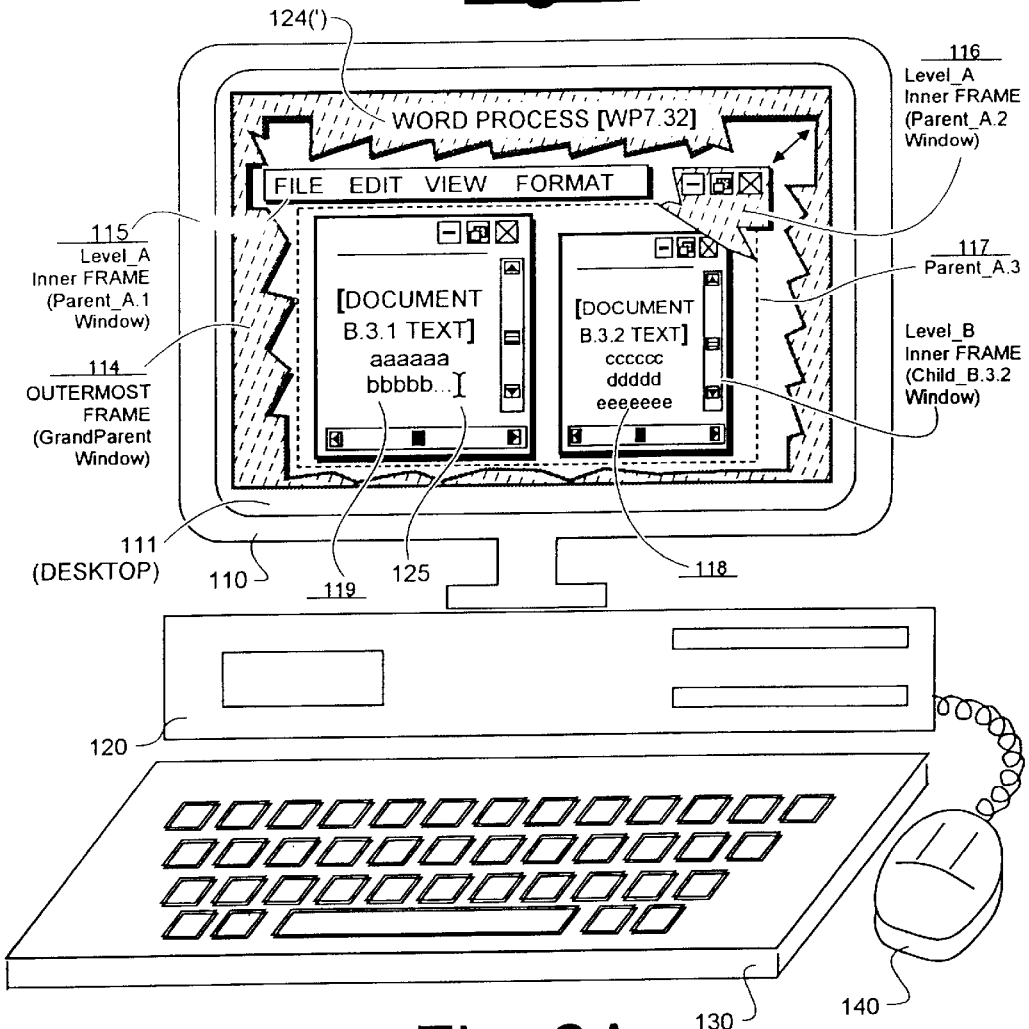
FIG. 1 is a perspective view showing a computer system that may be configured to operate in accordance with the invention.

FIG. 1 illustrates a perspective view of an overall computer system 100 that may be programmably configured to operate in accordance with the invention. This view will be used to explain a dilemma that can confront users when an in-use application program freezes or crashes before the user has had a chance to nonvolatily save work that is in progress.

The illustrated computer system includes a display monitor 110, a computer housing 120, a keyboard 130 and a mouse 140. The illustrated user input and output devices 110, 130 and 140 are merely examples. Other to-user output devices and from-user input devices may, of course, be used in addition to or in place of the illustrated devices. Mouse 140 for example can be replaced by or supplemented with other graphically-oriented user input devices such as trackballs, touch pads, joysticks, and so forth. Voice input and/or output interfaces are contemplated in addition to the illustrated visual and tactile interfaces.

Display monitor 110 includes a display screen 111 that can display a number of graphical items including a desktop layer and an overlying, opened application window 114. (Reference symbols that are braced by square brackets are not part of what is displayed on the screen 111.) In the illustrated example, the opened application window 114 contains information belonging to a running word processing program 124, where the latter program 124 has the fictional name, WORD PROCESS. The actual word processing program could be Microsoft WORD™, or Corel WordPerfect™, or any one of a host of other commercially available word processing programs. In the more concrete example given below, it will be assumed to be WordPerfect™ version 7.x. The application window 114 could alternatively have contained a spreadsheet program (e.g., Microsoft EXCEL™), a picture-drawing program (e.g., Adobe Illustrator™), an Internet browser program (e.g., Microsoft Explorer™), an electronic mailing program (e.g., Qualcomm Eudora™) or any other such application program. The example of a word processing program is used here because many computer users are at least familiar with this type of application program.

Application window 114 normally appears as being continuously filled with other items such as vertical and horizontal scroll bars, ruler bars, tool bars (not all shown), and a top menu bar 115. The top or main menu bar will typically have menu-dropping areas such as FILE, EDIT, VIEW, FORMAT, etc. This is common for example in programs running under Microsoft Windows98™ or Microsoft NT™. The display of window 114 will normally not have the appearance of separated puzzle pieces such as is shown in FIG. 1. However, in truth the contents of what appears to be a unitary application program window such 114 are usually a cleverly integrated set of puzzle pieces, where the puzzle pieces are formed from other windows, and windows within those windows and so forth, all of these separate puzzle pieces being neatly tiled together to define a composite display object. The end user may not be aware that many parts of what appears to be a smoothly integrated main application window 114, are instead seen by the OS as a collection of separate windows.

For purpose of reference, the outermost window frame in FIG. 1 is referred to herein as the grandparent window 114. Immediate and hierarchical children of this outermost, grandparent window frame 114 are referred to herein as Level_A inner frames or more simply as Level_A 'parent' windows. Immediate children of the Level_A inner frames are referred to herein as Level_B inner frames or more simply as Level_B child windows. Each Level_B window may have its own, Level_C children and so forth. A tree-like organizational chart (see FIG. 2B) may be drawn to show which window is a child of which other window. Such a chart is known in the art as a windows hierarchy chart.

By way of a more concrete example, consider in FIG. 1, the topmost menu bar 115 in the application program window 114. This bar 115 will normally appear to a user as a seamless and integral part of outermost window 114. However, for purpose of this disclosure, bar 115 is shown for what, under usual circumstances, it really is to the operating system, namely, a Level_A child of grandparent window 114. Menu bar 115 is also referred to herein as a Parent_A.1 window so as to distinguish it from other Level_A children of grandparent window 114.

Consider next the combination of the main window's "minimize" button (symbolized as a minus sign in a square), its "shrink" button (shown as two overlapped rectangles in a square) and its "close" pushbutton (symbolized as an X in a square). These are illustrated in respective left to right order within puzzle piece 116. This puzzle piece 116 will normally appear to a user as a seamless and integral part of outermost window 114 that is placed in the upper right corner of frame 114. However, for purposes of this disclosure, the pushbuttons part 116 is shown for what it really is to the OS, namely, another Level_A child of grandparent window 114. Pushbuttons part 116 is also referred to herein as a Parent_A.2 window. Alternatively, each of the separate pushbuttons in puzzle piece 116 may be a separate Level_A child window. This explanation is just by way of illustration and does not limit the numerous ways in which parent and child windows may be interlaced to form a composite display object 114–119.

Consider next, a dashed rectangle 117 that is shown inside the confines of grandparent window 114. The borders of some windows may be invisible to the end user even though they are known to the operating system. Dashed rectangle 117 represents such an invisible-borders window that is a further Level_A child of grandparent window 114. This invisible-borders window 117 is also referred to herein as the Parent_A.3 window and also as a 'documents container' (for reasons that will be apparent shortly). Besides windows that have displayed areas which are visible to the end user, some programs (e.g., 124) can have hidden windows that are kept behind other windows and are thus completely invisible to the end user. (As an extension to this point, it may be noted that one of the more common problems that novice users encounter when they think their application program has 'crashed' is when an active window becomes hidden behind a passive window, and the hidden active window is waiting for a user input, such as a click on an 'OK' pushbutton. The application program would run just fine once the 'OK' pushbutton of the hidden dialog box is pressed. But the user does not see this 'soft' defect and therefore does not realize that it simply this failure to respond 'OK' which is causing the program to appear frozen.)

As explained above, Level_A windows may have children of their own. In the illustrated example, windows 118 and 119 are Level_B children of the Parent_A.3 window (117). Scroll bars, minimization pushbuttons and further such items within windows 118 and 119 may constitute Level_C children of the respective Level_B windows 118 and 119. However, it is not necessary here to detail their inner structures because we will be focusing instead on the data contents of the Level_B windows 118 and 119.

In the illustrated example, we assume that child window 119 contains word processor-produced text for a first file or 'document' named DOCUMENT_B.3.1. Child window 118 similarly contains word processor-produced text for a second file or document named DOCUMENT_B.3.2. These fictitious document names are selected here to simplify the task of understanding that the text of DOCUMENT_B.3.1 is held within a first Level_B 'child' (window 119) of the third Level_A parent window 117 and that the text of DOCUMENT_B.3.2 is held within a second Level_B 'child' (window 118) of the same Parent_A.3 window 117.

Normally, one would see a user-movable cursor (not shown) displayed on screen 111 in the form of an arrowhead or the like that is made movable over the other displayed items in response to user activation of the mouse 140 or of another such from-user input device. However, we assume here that our exemplary word processing program (124) has just suffered a freeze or a crash just at the time that the user was typing in some additional text into DOCUMENT_B.3.1 (119) at the position of the illustrated, text-insert icon 125. The user had not yet saved this new text (e.g., "bbbb . . . ") or some additional text (e.g., "eeee . . . ") that had just been typed into DOCUMENT_B.3.2 (118).

After the freeze, the user allowed an unfreezing program such as Symantec CrashGuard™ (which is available from Symantec Corp. of Cupertino, Calif.) to attempt an unfreeze operation on the just-froze word processing program 124. The attempted unfreeze operation was able to partially revive the just-froze application program 124. The just-revived application program, now referenced as 124', is able to respond to some simple, test messages sent to it from the OS. However, for unknown reasons, the just-revived application program 124' is not fully functional.

As an example of what such partial nonfunctionality might entail, assume that the cursor arrowhead that normally moves on screen in response to mouse movements fails to show up inside window 114. A novice user may react in a panicked way after coming to believe that because the cursor arrowhead is invisible, and even though the unfreeze operation had executed successfully, he or she still cannot invoke the SAVE function that would normally be provided in GUI style from within a drop-down menu (not shown) that unfurls from the FILE portion of menu bar 115 after the user moves the cursor arrowhead over the FILE item (in bar 115) and clicks thereon with the mouse 140. A more advanced user may come to realize that file contents can still be saved by using an alternate method for invoking the FILE function, such as pressing on the Alt and F keys of the keyboard 130. Sometimes this alternate method works. Sometimes it doesn't. That may depend on whether or not the main menu window 115 is able to send messages to the B.3.1 document window 119 by way of the grandparent window 114 of the just-revived program 124'.

Alternatively, assume that the arrowhead shaped cursor (not shown) does appear within grandparent window 114 but either the FILE drop-down menu does not unfurl in response to mouse clicks on FILE, or if it does, the computer fails to react to mouse clicks on the SAVE item (not shown) of that unfurled drop-down menu. Once again, the novice user may react in a panicked way after coming to believe that, even though the unfreeze operation had been run, he or she has lost all work product that has been created since the last save to hard disk. Even a user of advanced skills may panic, particularly if the skilled user is not intimately familiar with the inner workings of the file-saving functions of the just-revived program 124'. In the state of panic, the novice and/or advanced user may try to invoke operations that overly stress the just-revived program 124' and cause it to freeze again, thereby worsening the situation.

The present inventors have found through experimentation that it is highly advisable, immediately after a program (e.g., 124) has apparently become frozen and has apparently just been revived, to perform the following steps:

(1) identify those child windows (e.g., 118 and 119) of the apparently just-revived program 124' that contain data in need of saving; and (2) send in the recited order, one or both of a SAVE and a CLOSE message directly to each such data-containing window.

From among the three possibilities of sending only a SAVE message, sending a SAVE and thereafter a CLOSE message, and sending only a CLOSE message, the present inventors have found through experimentation with commercially popular application programs that the last option of sending only a CLOSE message was the most effective and easily implemented approach.

The present inventors have further found that it is also highly advisable to automate this window closing process in a way which generally prevents a panicked user from interfering and perhaps doing something else. The automated mechanism of the invention persistently tries to immediately save as many pieces of work-in-progress that it can to a nonvolatile storage means such as a local magnetic hard disk or a networked file server or other such work-preserving means. More details are given after we first describe a typical hardware and software configuration.

Figure 2A:
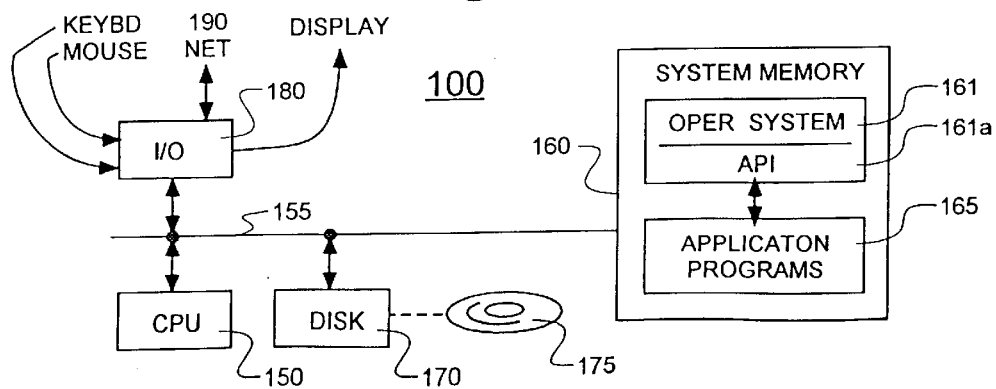
FIG. 2A is a block diagram of a computer system that may be configured to operate in accordance with the invention.

Referring now to FIG. 2A, a possible method for interconnecting components of computer 100 is shown schematically. Computer 100 may include a central processing unit (CPU) 150 or other data processing means (e.g., plural processors), and a system memory 160 for storing immediately-executable instructions and immediately-accessible data for the CPU 150 or other processors. System memory 160 typically takes the form of DRAM (dynamic random access memory) and cache SRAM (static random access memory). Other forms of such high-speed memory may also be used. A system bus 155 operatively interconnects the CPU 150 and system memory 160.

Computer system 100 may further include non-volatile mass storage means 170 such as a magnetic hard disk drive, a floppy drive, a CD-ROM drive, a re-writeable optical drive, or the like that is operatively coupled to the system bus 155 for transferring instructions and/or data over bus 155. Instructions for execution by the CPU 150 may be introduced into system 100 by way of computer-readable media 175 such as a floppy diskette or a CD-ROM optical platter or other like, instructing devices adapted for operatively coupling to, and providing instructions and data for the CPU 150 (or an equivalent instructable machine). The computer-readable media 175 may define a device for coupling to, and causing system 100 to perform operations in accordance with the present invention as further described herein.

System 100 may further include input/output (I/O) means 180 for providing interfacing between system bus 155 and peripheral devices such as display 110, keyboard 130 and mouse 140. The I/O means 180 may further provide interfacing to a communications network 190 such as an Ethernet network, a SCSI network, a telephone network, a cable system, or the like. Instructions for execution by the CPU 150 may be introduced into system 100 by way of data signals transferred over communications network 190. Communications network 190 may therefore define a means for coupling to, and causing system 100 to perform operations in accordance with the present invention. The instructing signals that are transferred through the communications network 190 for causing system 100 to perform said operations may also be manufactured in accordance with the present invention.

System memory 160 holds executing portions 161 of the operating system (OS) and of any then-executing parts of application programs 165. The application programs 165 generally communicate with the operating system by way of an API (application program interface) 161a. One of the operations that is routinely carried out, is the passing of object-oriented messages from one window object (not shown in FIG. 2A) to another such object within system memory 160. Often the OS 161 will act as an intermediate carrier of such messages. System memory 160 may include memory means for causing system 100 to perform various operations in accordance with the present invention as is further described herein.

With GUI-type operating systems (OS's) such as Microsoft Windows 3.1™ or Microsoft Windows95™, or Microsoft Windows NT™ 4.0 the OS often temporarily stores data object specifications of executable or other software objects that are currently 'open' and immediately executable or otherwise accessible to the CPU 150. Although not specifically shown in FIG. 2A, parts of system memory 160 can be dynamically allocated for storing the data object specifications of open objects. The so-allocated memory space may be de-allocated when the corresponding object closes. The de-allocated memory space can then be overwritten with new information as demanded by system operations and actions of third party application programs. One of the data object specifications that the OS stores is a definition of which open window is a child of which open parent.

FIG. 2B illustrates an example of a windows hierarchy chart 200 as such may be defined within a given computer (e.g., 100 of FIG. 1). Where practical, like reference numerals in the "200" century series are used for elements of FIG. 2B that correspond to elements referenced by "100" century series numbers in FIG. 1. Accordingly, element 211 corresponds to the desktop window 111 of FIG. 1. Element 214 corresponds to the outermost program window 114. Chart element 214 is understood to be a child of parent element 211 by virtue of the branch connection 213 which extends from trunk line 212. It is understood that many other branches (not shown) and correspondingly attached sub-trees may emanate from trunk line 212.

Similarly, chart elements 215, 216, 217 are understood to be hierarchical children of element 214 by virtue of the respective sub-trunk and branch connections which extends from element 214. Furthermore, chart element 218 is understood to be hierarchical child of container element 217 by virtue of the respective sub-trunk and branch connections which extends from element 217.

Referring by way of example to chart element 214 (the one representing the Word Process Outermost window 114), it is seen that each chart element can be identified by a variety of attributes, including, but generally not limited to: (a) an OS 'handle' 214a assigned to its corresponding window by the OS, (b) a window 'caption' field 214b which may be blank or filled and whose contents do not necessarily show in the actual window; (c) a parent window (PW) handle 214c which is the same as the OS handle of the corresponding parent and can thereby provide a back link to the parent window; (d) a 'class name' 214d which defines certain behavioral attributes of the window; (e) a 'control identifier' 214e that may optionally be assigned to the window by its parent so the parent can distinguish among its various children if there is more than one; and (f) further attributes such as 'style' bits which turn various aspects on or off and rectangle size/location fields which indicate the size and location of the corresponding window. It is to be understood that the OS can maintain a data structure within memory that conforms fully or partially to the hierarchy chart 200 shown in FIG. 2B.

In the Windows95/98™ environment, a Spy++™ program, which is available as part of Microsoft's standard programming tools, can be used to spy on a program's windows hierarchy and to display a windows hierarchy tree similar to what is shown in FIG. 2B.

Class names such as found in regions 214d, 215d, 216d and 218d of FIG. 2B can come in at least two flavors: generic and unique. A generic class name is one that is typically used by many different windows and does not therefore, uniquely distinguish one window from all others. Examples of generic class names include 'MDI_Client' (Multi-Document Interface Client) such as is shown at 217d. Other examples of commonly used, generic class names include: ScrollBar; Edit; MsoCommandBar (Microsoft Office menu bar); MsoCommandBarDock; WwB (Windows work block); and WwC (Windows work Container). Class names such as 'Menu BAR' and 'BUTTON' or 'BUTTONS' (216d) are further examples of names that may be deemed generic.

On the other hand, a unique class name such as the 'WordPerfect.7.32' of region 214d usually distinguishes a given window (e.g., 114) as belonging to a particular program (e.g., Corel WordPerfect7.0™ for Win32 operating systems) and/or as being the outermost frame of that application program (124).

Whenever a new window is created, the OS usually assigns a unique, window handle number to that window. The OS handle number (e.g., the one stored respectively in 214a–218a) may be used to uniquely address a given window. However, OS handle numbers are often assigned randomly during each run of the operating system, and as a consequence, one cannot be sure that a given OS handle will be used each time for a given window.

When a parent window (e.g., 114) has more than one immediate children, it may or may not wish to address those children (e.g., 115, 116, 117) individually, To this end, the parent window may assign, locally-unique, control ID's (e.g., A.1, A.2, A.3) to its respective child windows such as indicated in regions 215e–217e. Although illustrated as alphanumeric designations, control ID's may come in a strictly numeric format.

The windows hierarchy structure 200 of a given program may be scanned by manual or automatic means to determine which of its windows contains data that is worth saving in case of a freeze. For example the Highlight function of Microsoft's Spy++ program may be manually deployed to identify a correspondence between an on-screen window such as 118 and the hierarchical chart element (e.g., 218) which defines its hierarchical position within the chart 200.

In general, different programs have respective and different windows hierarchy structures. It is up to the programmer to decide which windows should be children of what other windows, what sequence they are opened up in, and whether each given window is of a generic or unique class. A database may be constructed for each of multiple, commercial programs to identify where in the windows hierarchy of each, there will most likely be a window that contains information that the end user would generally consider vital.

In the examples of FIGS. 1 and 2B, the immediate children of Parent A.3 (117, 217) will be the ones holding such 'vital' data that a user will most likely want to save, first and foremost, before saving other data that may be contained in other windows of the just-revived program 124'. It has been found that the simple sending of a CLOSE message to the window (e.g., 118) which directly holds work product information (e.g., typed text, spreadsheet records, drawing vectors, etc.) usually causes that window to nonvolatily save its own work product information to disk (or elsewhere) and to thereafter close such that other objects cannot corrupt its contents. On the other hand, if a CLOSE message is sent to a window (e.g., 117) which indirectly holds work product information, the work product information that is indirectly contained therein will generally not be saved, and worse yet, the ability of the immediate data-holding windows (e.g., 118, 119) to thereafter perform a SAVE operation upon receipt of a CLOSE command may be corrupted.

It is therefore desirable, in accordance with the invention, to precisely identify the one or more windows of a just-revived application program (e.g., 124') that immediately contain vital data and to issue one or both of a SAVE and CLOSE command messages to such windows. For some off-the-shelf, commercial programs, such as Corel WordPerfect7/8™, the step of identifying the windows that immediately contain vital data is relatively simple because these files have a unique class name (e.g., WP_Doc_Frame such as shown at 218d). However, for other application programs, such as Microsoft Word 6/7/8™, the windows that immediately contain vital data have generic class names (e.g., WwB) and worse yet, the outer container windows (e.g., 117) that contain such vital-holding, inner windows also have a same or other generic class name. This factor makes it difficult to automatically locate the correct windows of an arbitrary, just-revived program 124' that contains vital data and should therefore be first commanded to SAVE and CLOSE.

Figure 3:
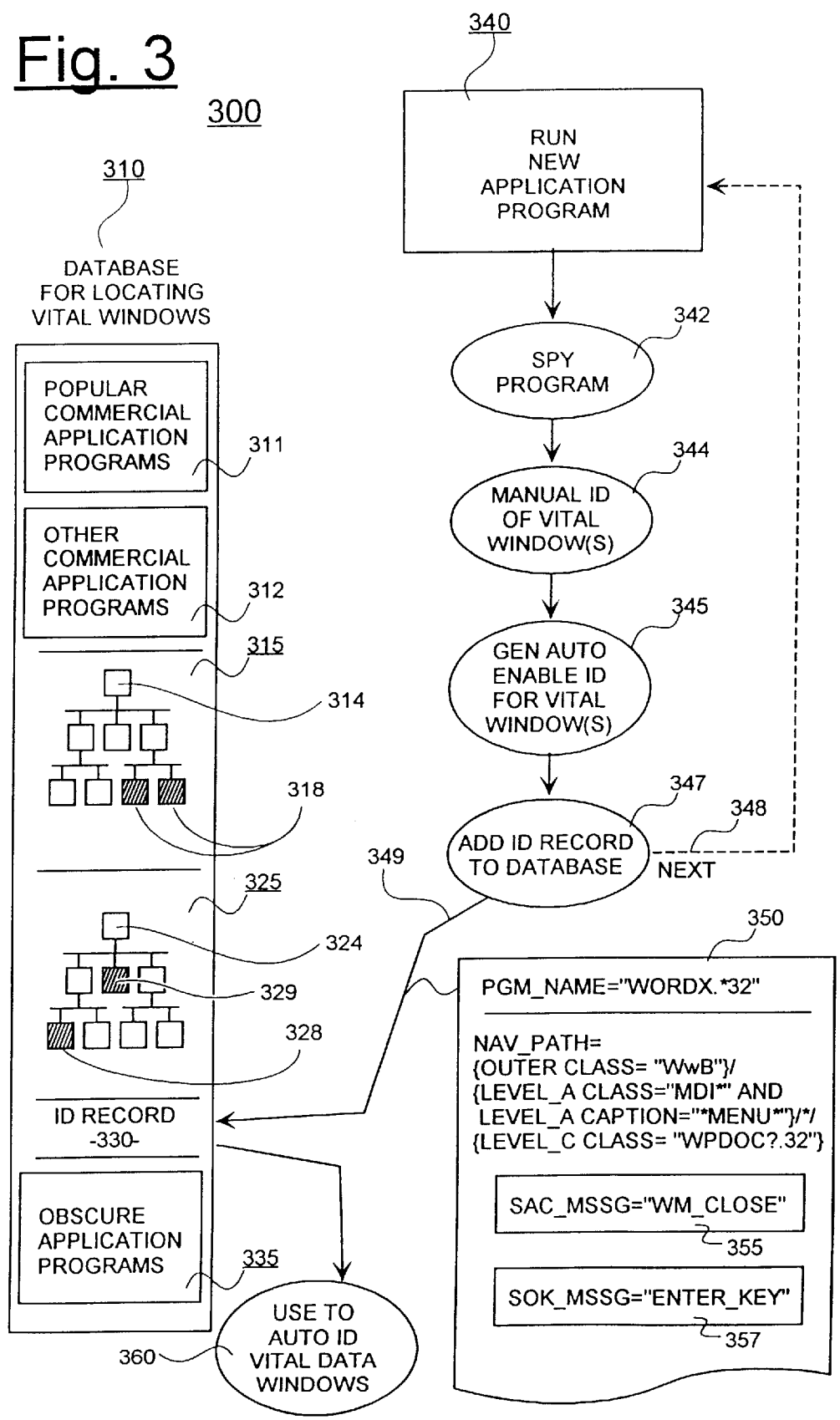
FIG. 3 illustrates a database building system in accordance with the invention.

FIG. 3 illustrates a system 300 in accordance with the invention for use in identifying the appropriate windows that contain vital data that a user most likely wants to save after an apparent freeze. A profiling database 310 is built up in accordance with the invention for helping to identify the vital data-containing windows of both popular (well known) and commercial application programs as well as for making intelligent guesses on which windows of obscure application programs are most likely to contain the vital data that the user would most likely want to save after an apparent freeze. The database 310 may be formed as part of the general registry of the computer system or by other convenient means.

As seen, a first searchable part 311 of the database is dedicated to pre-existing and well-known commercial application programs such as various versions of Microsoft Word™, Microsoft Excel™ and various versions of other popular word processing and spreadsheet programs. A second searchable part 312 of the database is dedicated to pre-existing, but less well-known, commercial application programs. A third searchable part 335 of the database is dedicated for adding on, navigation path definitions for locating the vital data-containing windows of afterwards created or later found, application programs.

The various parts of the database 310 are searchable by a machine-implemented search engine for finding a navigation path definition that either matches with both the program name of a just-revived program 124' and also matches with a navigation-path to-an-existing-window found in the just-revived program 124'; or that correlates (statistics wise) with a navigation-path to-an-existing-window found in a just-revived program 124' (of unanticipated name) such that the found navigation path definition provides a rough best guess profile for the locating a vital data-containing window in the domain of the just-revived program 124'.

This can be explained better by considering an example of how a new record (ID RECORD) 330 for distinctly identifying a vital data-containing window is added to the database 310. At step 340, a new application program is run (executed and exercised, preferably by a skilled artisan) for the purpose of defining one or more navigation paths to its vital data-containing windows. At step 342, a spying program such as Spy++™ is used for detecting the presence of different windows within the running program (340) and for tracing the parent/child hierarchies that form within the running program.

At step 344, dummy or actual vital data is generated through the use of the running program (340) and the spying program (342) is used to identify the location of a corresponding, vital data-containing window (e.g., 328) within the parent/child hierarchy chart (e.g., 325) of the running program (340). The spying program (342) is further used to identify attributes of the vital data-containing window (e.g., 328) and attributes of its parents or grandparents (e.g., 324) that will help to distinctively isolate or uniquely identify the vital data-containing window based on such attributes. It is to be understood that above steps 342, 344 and below step 345 are preferably to be carried out by a skilled artisan who understands the internal and hierarchical nature of multi-window, composite objects, and understands the difference between rules that distinctively isolate windows of interest as opposed to rules that are merely satisfied by windows of interest (but are also satisfied by windows whose contents are not worthy of being saved.) The skilled artisan is responsible for identifying specific attributes of the spied-upon windows that can be used for distinctively isolating windows of interest.

The window-related attributes that the inventors have found to be most useful in this endeavor, are first and foremost, the class (e.g., 314d) of each child or parent and secondly, the sequence in which such class assignments appear as one traces down the windows hierarchy chart (200) from outermost frame (214) to the window (e.g., 218) that immediately contains the vital data. Another attribute that may be used alone or in combination with window class for such ferreting out of the vital data-containing window, is the window caption attribute (214b). For some specific types of application programs (e.g., Internet browsers), the control ID (214e) that is assigned in a unique way to certain child windows may be useful for ferreting out such child windows.

Also, it may be valuable to pay attention to hierarchy patterns in which a window of interest is always accompanied by another window whose data is not of interest. It may be worthwhile to define parallel satisfaction rules that isolate windows whose data will not be saved, so that windows of interest can be better isolated. Assume for purposes of this example only that, in the hierarchy tree shown at 325, item 329 is a window of interest while item 328 is a window whose data is not of interest. Assume further that no direct rule can be devised for isolating target window 329 (because for example, it is an immediate child of outermost window 324 and other such immediate children all have a same set of nondistinguishing attributes.) Assume yet further that target window 329 can be nonetheless isolated by the fact that it does not have a child of its own like window 328. A parallel satisfaction rule can then be devised to say that not only does the target window 329 have to satisfy a certain navigation rule to its position in the hierarchy, but also that there must simultaneous satisfaction (affirmative or negative) of a parallel navigation to another window, such as non-target window 328.

One or both of manual and automated methods may be used for generating a set of rules that will enable best-guess, and automated identification of vital data-containing windows. Step 345 represents such methods for generating window-identification rules that will enable best-guess, automated identification of vital data-containing windows. As explained above, it will often be necessary to have a skilled artisan involved, namely one who understands the concepts of window hierarchies and of the difference between distinguishing and non-distinguishing rules for navigating to a target window. The manual and/or automated methods of step 345 should establish rules which automatically exclude application windows that are least likely to contain vital data and which automatically include application windows that are more likely to contain vital data.

Step 347 represents the adding or recording of a new database record 349 into the database 310, where the added record 349 defines the window-distinguishing exclusion and/or inclusion rules (direct and/or parallel) that is/are usable by a machine for automatically and distinguishingly identifying the window(s) that was/were manually identified in step 344. After the new ID record is added (349), looping step 348 may be followed for identifying a next, one or more target windows that store vital data within the running application (340) or within a next-to-be categorized, application program.

A more specific example of window-identification rules is shown in boxed illustration 350. The boxed rule (350) may be read as follows: The identified window is likely to contain vital data IF the name of the just-revived application program (124') satisfies a first search query, namely, PGM_NAME="WORDX.*32", where the asterisk (*) inside the search query represents a multi-character wild card (or more specifically, an arbitrary string of none, one or many characters), AND IF the navigation path to the window is such that the outermost application frame on the desktop satisfies the second search query: OUTER_CLASS= "WwB", AND the next successive hierarchy level parent (Level_A) satisfies the more complex search query: {LEVEL_A CLASS="MDI*" AND LEVEL_A CAPTION="*MENU*"}, AND the next successive hierarchy level window (Level_B) satisfies the don't care condition: Attribute=*, AND the next successive hierarchy level, which is the targeted child window (e.g., Level_C) satisfies the search query: {LEVEL_C CLASS="WPDOC?.32"} where the question mark (?) is a single character wild card. See also the flow chart of FIG. 5 which is described below.

The illustrated rule 350 is of course, merely an example and therefore conveys the contemplation herein of many variations, including but not limited to: (a) not defining the program name (PGM_NAME) or allowing the PGM_NAME qualifier to be the multi-character wild card (*); (b) additionally or alternatively using further Boolean operators such as NOT and OR to respectively exclude and include various navigation sub-paths; and (c) using attributes other than CLASS and CAPTION for defining satisfaction conditions (e.g., CONTROL_ID="B.2").

In general, the rule for satisfaction of the PGM_NAME query can be relaxed (made easier to satisfy, the ultimately relaxed rule being PGM_NAME="*") in counterbalance to a tightening of the NAV_PATH rules and vice versa. In other words, if the PGM_NAME is very tightly-defined (e.g., PGM_NAME="WORDPERFECT.7.32.05"), then navigation path rules can be correspondingly loosened (e.g., NAV_PATH=*/MDI*/*). If the navigation path rules are very tightly-defined (e.g., NAV_PATH="*/MDICLIENT/ WPDOC.7.32"), then the PGM_NAME satisfaction rule can be loosened in comparison because it is unlikely that another application program would, by happenstance, satisfy such tight NAV_PATH rules.

In one embodiment, the rules records (such as ID record 330) are ordered alphabetically to simplify searching through them. In an alternate or complementary embodiment, the rules records (such as ID record 330) are ordered in accordance with likelihood of occurrence so that the records (311) of the more popular, commercial products are searched first for satisfaction and records (335) for obscure applications, including those whose names cannot be pre-anticipated are searched last. If the just-revived program 124' is such an obscure program whose name and/or windows hierarchy structure cannot be pre-anticipated, the hope is that the obscure program (335) conforms to a windows hierarchy and CLASS/CAPTION pattern of some other obscure or more popular (312) application program whose windows hierarchy and CLASS/ CAPTION pattern have already been captured in the database. It has been found, for example, that the general rule: PGM_NAME="*" and NAV_PATH="*/MDICLIENT/*" is quite useful for correctly identifying the vital data-containing windows of many obscure application programs.

It is sometimes useful to specify a Save-And-Close (SAC) message stream that is to be sent to a vital data-containing window. The illustrated SAC_MSSG field 355 of FIG. 3 may be used to store the Save-And-Close message stream that is to be used in response to satisfaction of one or both of the PGM_NAME and NAV_PATH rules. In one embodiment, if field 355 is empty or not present, the default SAC message stream includes one or both of the Microsoft Windows messages, "WM_CLOSE" and "WM_ENDSESSION".

It is sometimes useful to specify a Save-OK (SOK) message stream that is to be sent to a save-blocking dialog that is put up by a vital data-containing window during the Save-And-Close operations of the vital data-containing window. The illustrated SOK_MSSG field 357 of FIG. 3 may be used to store the Save-OK message stream that is to be used in response to such save-blocking dialogs if there is a preceding satisfaction of one or both of the PGM_NAME and NAV_PATH rules. In one embodiment, if field 357 is empty or not present, the default SOK message stream includes "ENTER_KEY" which represents a virtual pressing of the keyboard ENTER key by the user. For some application programs, it has been found that the SOK message stream (357) can be the same as the SAC message stream (355). In other words, if a "WM_CLOSE" message or another such SAC message or message stream is sent to the save-blocking dialog, the save-blocking dialog interprets the response with such a SAC-like message as a confirmation that the controlling user or program wishes to continue with the Save-And-Close operation, and as a consequence, the save-blocking dialog closes itself and lets the SAC operation continue unabated.

The rules record that is represented in FIG. 3 at location 315 is shown in pictorial form to graphically demonstrate the idea that multiple windows at a given hierarchy level (e.g., Level_C) may satisfy a corresponding search query.

Thus in illustrated record 315, the satisfying navigation path starts at outermost frame 314, excludes all the level_B windows, and finally isolates a distinguished subset, 318 of plural windows in level_C as being the best candidates for containing vital data. By contrast, the rules record that is graphically represented at 325 simultaneously isolates both a level_B window 329 and a level_C window 328 as being the best candidates for containing vital data for its respective application program. Those skilled in the art will realize of course that a complex, cross-level rule such as represented at 325 may be replaced with two ID records that have simpler distinguishing rules (one for 328 and another for 329), each for isolating candidates in a single and respective hierarchy level. Many other variations of this type for formulating the candidate isolating rules and/or the candidates-selecting knowledge database, will of course become apparent to those skilled in the art in view of the present disclosure.

Step 360 represents a machine-implemented process which uses the records 311–335 of database 310 to make intelligent identification guesses or choices as to which one or more windows of a just-revived program (124') will most likely contain vital-data and what the order of likelihood is for the plural windows of a given, just-revived program (124'). It may be desirable to try the save-vital-data operations according to a sequence which starts with most-likely candidates and trails off with least-likely candidates so that, if the just-revived program 124' experiences further crashes or other freezes during the save-vital-data operations, at least the more likely candidates will have had a better chance of being saved before the multi-crashing program dies for good (cannot be revived anymore).

Figure 4:
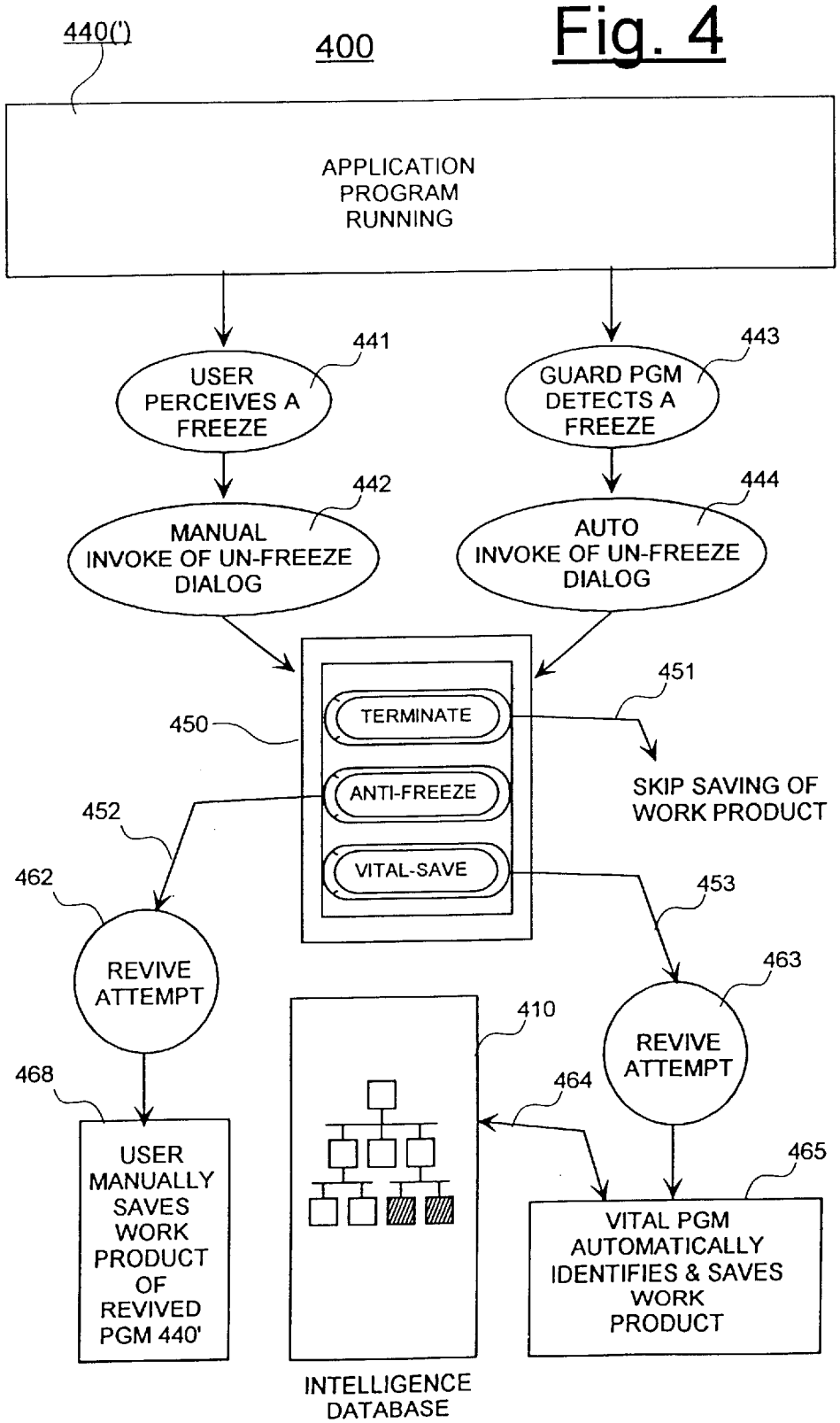
FIG. 4 is a flow chart showing how a vital save activation fits in within a composite of other revival and save options.

FIG. 4 provides a schematic diagram of a system 400 for so-utilizing a best-guess database 410 or the like. Application program 440 is one of plural, and preemptively multi-tasked programs running under an appropriate OS. At time point 441, the user detects a behavior or lack of behavior that cause the user to perceive program 440 as having become frozen. (This perception can be right or wrong as explained above.) At time point 442 and in response, the user invokes a defreezing subroutine that puts up dialog box 450. Alternatively, at time point 443, a guard program (e.g., Symantec CrashGuard™) that had been running in the background, detects a behavior or a lack of behavior (e.g., not responding to messages) in application program 440. This causes the guard program to perceive program 440 as having become frozen or having encountered a fatal error. At time point 444 and in response to detection step 443, the guard program automatically invokes the defreezing subroutine that puts up dialog box 450 on the user's display.

The illustrated dialog box 450 is shown by way of example to include three pushbuttons, respectively denoted as TERMINATE, ANTI-FREEZE and VITAL-SAVE. (Other terms could be used, and the VITAL-SAVE button or its equivalent could be presented with fewer or more of the other user-choice buttons. The unfreeze program may change the numbers and types of other buttons that are displayed in box 450 based on the context and environment under which the unfreeze program is asked to display dialog box 450.)

If the user clicks on the TERMINATE pushbutton, then action path 451 is followed, and the corresponding application program 440 (including all its concurrent threads) is automatically terminated by the OS. Because of this, if the user elects to click on the TERMINATE pushbutton, the user will be skipping the step of saving work product that has not yet been saved and will be risking the loss of such data.

If the user instead clicks on the ANTI-FREEZE pushbutton, then action path 452 is followed, and one or more revival techniques 462 are applied to the corresponding application program 440. (The revival techniques 462 can include those of the above-cited, U.S. Ser. No. 08/938,204.) After the revival attempts 462 are carried out, full control is returned to the user. The user is then allowed to manually attempt to save his or her unsaved work product by using functions of the just-revived program 440'/124' or by other user-selected means. This option is indicated by box 468. In using the manual-save approach, the user is risking the possibility that some or all of the SAVE (or SAVE_AS . . . , etc.) functions of the just-revived program 440'/124' may no longer be functioning either properly or at all. For example the FILE drop down menu of the outer window 114 may no longer be working. A novice user may not realize this and may keep typing under the mistaken belief that the resuscitation efforts 462 have brought the just-revived program 440'/124' back to full health. Then in a panicked surprise, the novice user may later discover that the FILE drop down menu of the outer window 114 is no longer working. This can result in poor choices by the user of what to do next. The less-automated, anti-freeze approach defined by steps 452–462–468 is acceptable if the human user is calm, skilled and understands the urgency of manually saving as much work product as possible; and also if the application program 440' is stable enough after revival attempt 462 to enable the calm and skilled user to manually save his or her work product.

If the user had instead clicked on the VITAL-SAVE pushbutton of dialog box 450, then action path 453 would have been followed. One or more revival techniques 463 are then automatically applied to the corresponding application program 440. The revival attempts 463 are generally the same as those applied in step 462 but they can be of a less aggressive (and of less potentially, application-destabilizing) nature given that vital data-containing windows will be automatically saved and closed in subsequent, and automated step 465.

After the revival attempts 463 are carried out, and as indicated immediately above, control is maintained by the machine and passed on to a vital-save program 465. Intercepting actions may be taken by the vital-save program 465 to prevent the user from gaining control over the just-revived program (440'/124') until after the vital-save program 465 has had an opportunity to automatically save the contents of, and/or close as many vital data-containing windows of the just-revived program (440'/124') as the vital-save program 465 can confidently identify. One of the ways in which the vital-save program 465 tries to prevent the user from gaining control, is by detecting dialog windows that are thrown up by the just-revived program 440'/124' (such as "Are you sure you want to close this document? Press ENTER or YES if true.") and by automatically selecting the correct option so as to allow window closure to complete unabated. Item 357 (SOK_MSSG) of FIG. 3 defines the correct option for the given situation. As explained above, if field 357 is empty or not present, the default SOK message stream will typically include the "ENTER_KEY" message or its equivalent to thereby define a virtual pressing of the keyboard ENTER key by the user. That typically selects the preferential default option of the thrown-up dialog box that is now blocking completion of the save-and-close operation for the vital data-containing window. The thrown-up dialog box then closes and thereby lets the save-and-close operation continue towards completion.

The automated process of identifying which windows in the just-revived program 440'/124' contain vital data, uses database 410 as indicated by connection 464. In one embodiment, database 410 of FIG. 4 is substantially the same as database 310 of FIG. 3. The vital-save process may include one or more of the following steps (1)–(10):

(1) Try to identify the name of the just-revived program 440/124', and if identified, search the database 410 and try to locate within database 410, a rules record whose PGM_NAME satisfaction rule most tightly conforms with the identified, program name;

(2) If the PGM_NAME identification step (1) fails, search the database 410 and try to locate within database 410, a rules record whose NAV_PATH satisfaction rules most tightly conform with one or more to-window navigation paths found within the just-revived program 440/124';

(3) If the NAV_PATH identification step (2) fails, search the database 410 and try to locate within database 410, a generalized or obscure rules record whose satisfaction rules conform in a relatively tight way with one or more of to-window navigation paths found within the just-revived program 440/124' such that the located rules record (e.g., NAV_PATH="*/MDICLIENT/*") defines a general 'style' for windows found within the just-revived program 440/124';

(4) De-suspend the just-revived program 440/124' so that the operating system begins giving task time to the revived program;

(5) Using the best guess provided by any one of steps (1)–(3), and as soon as possible after the de-suspend, send messages (e.g., WM_CLOSE) or instructions to the vital data-containing window that is best selected by one of steps (1)–(3) for causing that data-containing window to itself save its own data and thereafter, optionally shut itself down as cleanly as possible (one reason for this being so that the already-saved window does not block or interfere with savings operations of subsequently addressed windows);

(6) During the execution of each window-invoked save and shut down operation, optionally monitor the windows environment of the desktop to see if the saving/shutting-down window (the one containing what is presumed to be vital data) puts up any dialog box or other message that needs to be responded to in order to keep the save-and-shut-down process moving forward unabated. If such a process-abating dialog box or other message is detected, to the extent possible on an automatic basis, answer the dialog box or other message in a manner which will keep the save-and-shut-down process moving forward unabated. Where such automatic response to the process-abating dialog box or other message is not possible, put up a dialog box instructing the user to pick the option that in the process-abating dialog box that is least likely to block the continued carrying out of the save-and-shut-down process for the vital data-containing window;

(7) If during the execution of each window's self-invoked save and shut down operation, a further freeze or crash occurs, automatically detect that condition and automatically attempt to again revive the re-frozen program so as to continue the carrying out of the save-and-shut-down process for the corresponding, vital data-containing, window;

(8) Repeat steps (5)–(7) until there are no more vital data-containing windows left to instruct to save-and-shut-themselves-down;

(9) Wait for program status to switch to idle by, for example, using the WaitForInputIdle function of Windows95/98™, and thereafter record the name of, and shut down the main program by issuing to the main outer window (e.g., 114/214) of the program (440'/124') one or more command messages such as (in preferred order): WM_CLOSE and WM_QUIT. Even if the WM_CLOSE message does not work, the WM_QUIT message should at least force the program to quit its main message loop. Thereafter, if neither of these steps causes the program (440'/124') to shut down cleanly, use the TerminateProcess function of the OS to more forcibly terminate the frozen-and-afterwards-revived program (440'/124');

(10) Wait for the program termination to complete and thereafter, either automatically or after permission is manually granted by the user, relaunch a fresh (not corrupted) copy of the frozen-and-afterwards-revived program, and re-load into that fresh copy of the program, the data that had been saved by the process of steps (5)–(8).

Figure 5:
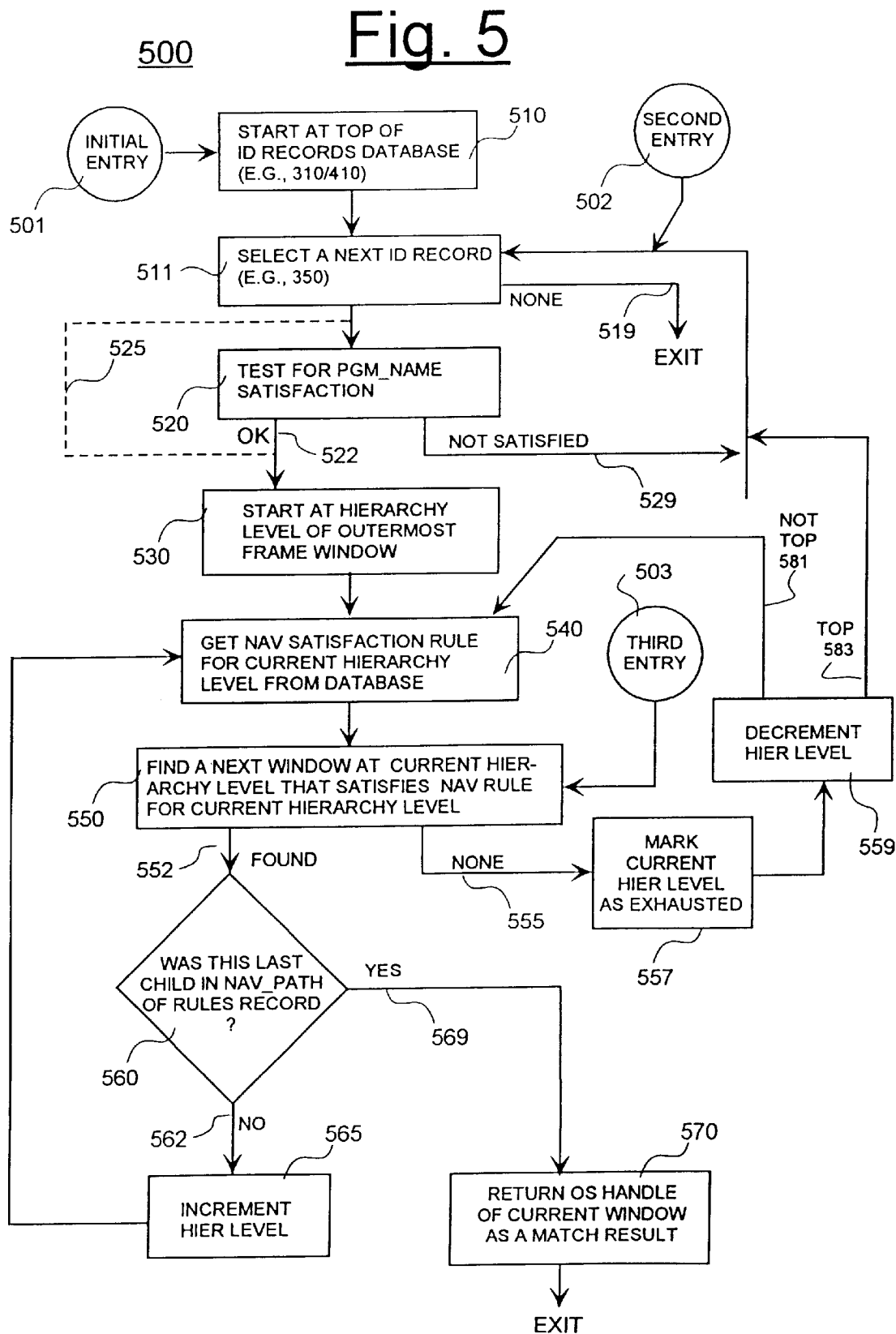
FIG. 5 is flow chart showing details of a vital save operation in accordance with the invention.

FIG. 5 provides a flow chart of a first identification process 500 for identifying those windows of a just-revived program 440'/124' that probably contain vital data. Initial entry is made at step 501.

At subsequent step 510, the method points to the top or other starting point of the ID records database 310/410.

At following step 511, the method selects a next ID record (e.g., 350) from within the database. If there is none, an exit is made by way of path 519 with an indication that no more records are available.

In one embodiment, step 520 follows while in an alternate embodiment, bypass path 525 is taken. In step 520, the machine-implemented method 500 tests for satisfaction of the PGM_NAME search criteria. Path 529 is taken back to step 511 if the PGM_NAME search criteria is not satisfied Path 522 (OK) is taken to subsequent step 530 if the PGM_NAME search criteria is satisfied.

At following step 530, a level-tracking pointer starts by pointing to the parent/child hierarchy of the outermost window (114/214) of the just-revived program 124'.

At subsequent step 540, that portion of the current navigation path criteria rule (NAV_PATH) that applies to the current parent/child hierarchy level is fetched. Initially the level is that of the outermost window (114/214), but as will be seen in step 565, the current level can be incremented to deeper levels, such as Level_A child, Level_B child, Level_C child and so on.

At subsequent step 550, a current parent/child hierarchy level in the windows chart of the just-revived program 440'/124' is scanned to find a next window within that part of the chart whose attributes satisfy the fetched navigation path criteria rule (NAV_PATH) for that current level. If there is no, next such criteria-satisfying window, path 555 is followed to step 557, where current tree search tracking controls are updated to indicate this level has been exhausted for the current tree branch that is being investigated.

If instead, a next such criteria-satisfying window is found, path 552 is followed to test step 560. In test step 560, it is determined whether the matching child window corresponds to the last entry in the navigation path criteria rule (end of NAV_PATH). If the answer is YES (569), then the window that has just been found is deemed to be a good candidate for being a vital data-containing window. At step 570, the OS handle (218*a*) of the matching window is output as an identification of such a good candidate. Of course, other means for uniquely identifying the good candidate window may be used alternatively. The result which exits out from step 570 may feed into a list-making routine which compiles a list of good candidates, where that list may be further sorted for distinguishing between candidates that are more likely or less likely to contain vital data. Alternatively, the result that flows out with the EXIT from step 570 may be immediately used for sending a Save-And-Close (SAC) message stream (e.g., 355) to the matching window of the just-revived program 440'/124'.

If the answer test step 560 is NO (562), then the window that has just been found is deemed to be merely a possible parent of a possible good candidate. The actual child window that is being sought is deeper into the search tree, and as such, step 565 increments the level tracking control to go to the next deeper level. If the current level had been the outermost frame (Level_0), then the next deeper level is Level_A. If the current level had been Level_A then the next deeper level is Level_B, and so forth. Control is thereafter given to step 540 and the loop continues until a matching window that meets the full criteria of the navigation path rule (from front to end of NAV_PATH) is found; or the search tree branch is exhausted and, as a result, the search should move on to a new branch.

As long as exploration of a given level is not exhausted, third entry point 503 may be used to repeatedly enter the loop defined by steps 550–560–540 and to search for more child windows that satisfy the full criteria of the navigation path rule. Once that section of the searchable tree is exhausted, the search recursively steps back up the tree to find the next unexplored branch by passing through step 559 (Decrement Hierarchy Level). If the top of the tree has not been reached, then control passes along path 581 back to step 540. On the other hand, if the top of the tree has been reached, path 583 returns control back to step 511 for the fetching of a next ID record. Alternatively, path 583 can be an exit step. The next-higher level of software can then selectively re-enter the illustrated loops by way of second entry point 502, which feeds into step 511.

A second method for performing identification of the vital data-containing window is given by the below pseudo-coded function, "FindMatchingChild". The function, "FindMatchingChild", accepts two parameters: 1) a particular branch-starting window whose descendants are to be searched; and 2) a list of satisfaction rules that are to be satisfied by the matching descendants. It is assumed that a global list of matches is being compiled for storing each of the successful matches. When the call to FindMatchingChild completes, a test may be run to see if it succeeded in finding a match by checking the size of the global list to see that it is either no longer empty or has grown.

The below pseudo-code for the FindMatchingChild function begins at a point that corresponds roughly to step 530 of FIG. 5. Some particular ID record has been selected and its rule list has been obtained.

The FindMatchingChild function can be employed in at least one of two ways: 1) by passing it the programs outermost window and a list of matching rules, or 2) by passing it the desktop window and requiring the first rule to find the program's outermost window (which window is a child of the desktop). These two methods should yield generally equivalent results. The second method provides a slightly greater amount of flexibility in that the name of the just-revived program (124') is not always identifiable by automatic means, but the just-revived program can be nonetheless identified as a child of the desktop (111) that has certain window attributes. The second approach also simplifies the process by integrating the step of finding the outermost grandparent window into the recursive procedure for searching for all the child document windows.

Using the rule list of the ID record 350 shown in FIG. 3, for example, the following parameters would be passed to FindMatchingChild: (a) the OS handle for the desktop window, and (b) the NAV_PATH rules: {Class="WwB"}/{Class="MDI*" & Caption="*MENU*"}/{Child=*}/{Class="WPDOC?.32"}.

The FindMatchingChild function searches each child of the desktop until it finds one of class "WwB", the outermost frame. It then calls itself recursively, passing the handle for the matched child and the trailing-remainder of the rule list to its called self. For each pre-matched child of that window, the recursive call applies the next trailing part of the rule and calls itself again. Any time the calls-to-self recurse deeply enough to satisfy the last criteria in the rules list, the child is stored away in the global list of matches.

```
FindMatchingChild( v_window, v_rules )
{
    FOR each child of v_window do
    {
        IF (child satisfies first rule in v_rules) then do
        {
            IF next rule exists in v_rules then
                FindMatchingChild( child, next rule in v_rules
                ELSE
                child satisfied all rules, ADD it to global list of
    matches
        }
    }
} //End of FindMatchingChild
```

As can be seen, the FindMatchingChild function recursively shrinks the size of the trailing part of the rules until there is none left. At that point it is known that the found child window satisfied all the criteria in the NAV_PATH rules. The match is appended to the global list at that time. Contents of the global list may be sorted as desired afterwards to determine which match should first be instructed to itself execute the Save-And-Close (SAC) operation (per message 355).

Figure 6A:
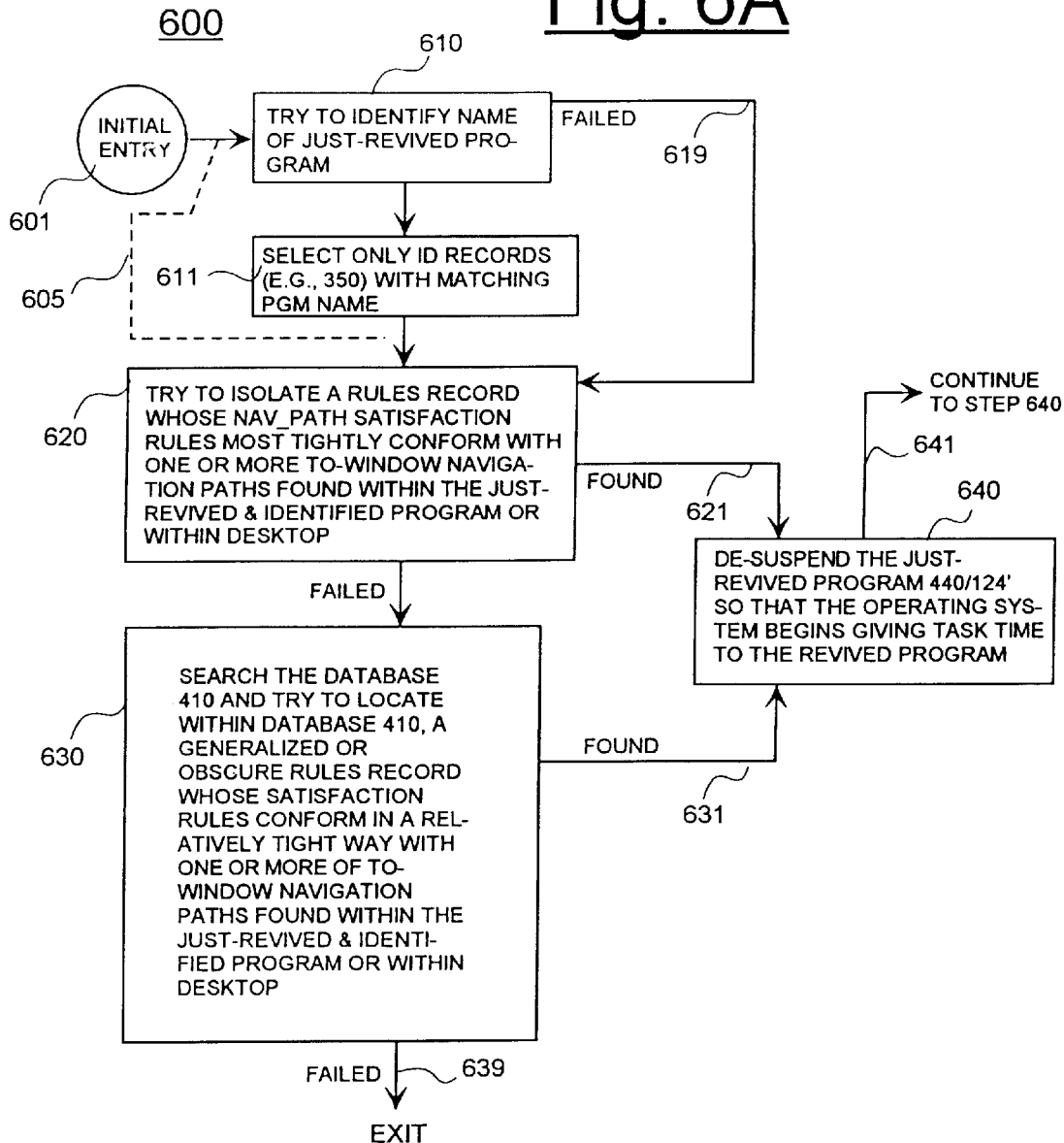

FIGS. 6A–6B combine to define a flow chart 600 depicting broader aspects of a machine-implemented, vital-save operation in accordance with the invention. Entry may be made at step 601. If bypass path 605 is not optionally taken, then at step 610 an attempt is made to identify the name of the just-revived program 440'/124'. In some instances this is a relatively trivial task and in some instances it may not work. Success depends on how well the just-revived program 440'/124' conforms to self-identification protocols and how the crashed, or otherwise frozen thread ties in with the main program. If the identification attempt fails, path 619 passes control to step 620. If the identification attempt succeeds, subsequent step 611 filters out from the database 310/410, those ID records (e.g., 350) whose PGM_NAME criteria are satisfied by the identification found in step 610, and these filtered out records are passed to step 620.

Step 620 may be arrived at from successful completion of filtering step 611, or by way of failure path 619 or by way of bypass path 605. The whole or subset of database 310/410 that is passed to step 620 is searched for rules records whose NAV_PATH criteria most tightly conform with navigation paths to windows actually found in the just-revived program 440'/124'. The algorithm of steps 530–570 of FIG. 5, or the above-specified recursive algorithm may be used to locate such tightly conforming windows. If the search or plural searches of step 620 is/are successful, the search results are passed by way of path 621 to step 640.

If the tight search(es) of step 620 is/are not successful, control passes to step 630. Here a more relaxed search is performed for rules records whose NAV_PATH criteria conform with navigation paths to windows actually found in the just-revived program 440'/124'. The algorithm of steps 530–570 of FIG. 5, or the above-specified recursive algorithm may again be used to locate such conforming windows. If the search or plural searches of step 630 is/are successful, the search results are passed by way of path 631 to step 640. If the loosened search(es) of step 630 is/are not successful, control passes by way of path 639 to a process exit point. In this case no windows have been found that conform with even the loosest of navigation path definitions in the database. This is an unlikely event because the database will usually contain a generalized set of catch-all definitions near its tail-end.

At step 640, one or more windows of the just-revived, but net yet re-activated program 440'/124' have been identified as those that are most likely or sequentially less likely to contain vital data. Step 640 'desuspends' the thread of the just-revived program 440'/124' so that the multitasking OS now begins to give processor time to the desuspended program.

At the same time that the revived program is desuspended, control passes by way of path 641 to step 645 (FIG. 6B). Depending on context, either the first, or the best, or the next best, or the next window that has been otherwise identified by any one or more of steps 601–640 is selected at step 645 as the window which probably contains vital data and is therefore in need of an immediate save-and-close operation.

At subsequent step 650, an appropriate message stream (e.g., SAC_MSSG="WM_CLOSE") or other instructions or sent to the window selected by step 645 so as to cause the selected window to itself save its own data.

Path 655 is an optional bypass around shut-down step 660. In one embodiment, the message stream (e.g., SAC_MSSG="WM_CLOSE") of step 650 inherently causes the receiving window to also gracefully shut itself down after it saves its own data. In an alternate embodiment, a separate message or instruction is sent to the window in step 660 for causing the receiving window to gracefully close itself. Once the window is closed, it is protected from being corrupted by potentially bad, future actions of various components of the just-revived program 440'/124'.

Bidirectional coupling 661 represents a first, optional monitoring and automatic interceding action that can be carried out while the Save-And/Or-Close operations of steps 650 and 660 proceed forward. The self-saving (650) and/or self-closing (660) target window may try to put up a safety dialog box that prods the user with a question like. "Are you sure you want to save and/or close now? Enter for Yes. Hit Escape for Cancel." The safety dialog may then block the automatic continuance of the Save-And-Close process until the user responds appropriately. Step 662 repeatedly looks for such safety dialogs, and if not seen lets steps 650 and 660 continue. If step 662 detects a safety dialog, control is passed to step 664. To the extent possible on an automatic basis, step 664 send an appropriate message to the safety dialog window for closing that safety dialog window and letting the Save-And-Close process (650/660) continue unabated. In one embodiment, the safety window closing message is the SOK_MSSG defined by field 357 of corresponding ID record 350. If step 664 cannot automatically determine what the appropriate message is, control is passed to step 668 wherein the user is given appropriate suggestions for helping the user to decide what the best response is to the safety dialog window so that the Save-And-Close process (650/660) can continue unabated.

While a vital data-containing window is undergoing the Save-And-Close process (650/660), the vital-save process 600 waits at step 670 for a completion indication. During this time, a second, optional monitoring and automatic interceding action can be carried out to help the Save-And/Or-Close operations of steps 650 and 660 proceed forward. The self-saving and/or self-closing actions of the target window (e.g., 118/218/318) may cause a further crash or other freeze. Optional step 672 automatically monitors the environment for such further freezes and automatically attempts to again revive the re-frozen program so that the Save-And-Close process (650/660) can continue unabated.

One set of methods for automatically reviving a fatally crashed thread is disclosed in the above-cited U.S. Ser. No. 08/938,204 (COMPUTER METHOD AND APPARATUS FOR UNFREEZING AN APPARENTLY FROZEN APPLICATION PROGRAM BEING EXECUTED UNDER CONTROL OF AN OPERATING SYSTEM) and its explanation will thus not be repeated in detail here. Briefly, one of such methods provides a trace from the current top of the thread's stack towards its base, where the trace looks for a special signature (the CallWndPro process return signature).

After step 670 detects completion of a Save-And-Close process (650/660) for a first vital data-containing window (e.g., 118/218/318), control is transferred to step 675 for automatically determining if there are any more windows (e.g., 119/329) that need to have their contents saved. If the answer is YES, control loops back to step 645 for repetition of the Save-And-Close process (650/660) on a next vital data-containing window.

If the answer to test step 675 is instead NO, control is passed forward to shut-down step 680. Here, an attempt is made to terminate the main program after all of its vital data-containing windows have first been saved and gracefully closed. In one embodiment, process step 680 waits for the main program status to switch to idle by, for example, using the WaitForInputIdle function of Windows95/98™. It records the name of the main program, and after the idle state is detected, it tries to shut down the main program by issuing to the main outer window (e.g., 114/214) of that program (440'/124') one or more command messages such as (in preferred order): WM_CLOSE and WM_QUIT. Even if the WM_CLOSE message does not work, the WM_QUIT message should at least force the program to quit its main message loop. Thereafter, if neither of these steps causes the program (440'/124') to shut down cleanly, step 680 uses the TerminateProcess function of the OS to more forcibly terminate the frozen-and-afterwards-revived program (440'/124').

At next step 682, process 600 either automatically or after permission is manually granted by the user, relaunches a fresh (not corrupted) copy of the frozen-and-afterwards-revived program (440'/124'), and re-load into that fresh copy of the program, the data that had been saved by step 650. The user can then be made to perceive that his or her lost work product had been saved and the crashed main program as been brought back to full health.

The above described, machine-implemented or otherwise carried out processes for automatically locating data-containing windows in a frozen application program and for saving work product contents may be provided by appropriate software. Such software can be introduced into system 100 of FIG. 2A by way of computer-readable media (175) or as a electromagnetic, instructing signals (190) It has been explained above that system I/O module 180 may use system bus 155 for transferring data between one or more of the illustrated portions of system 100 and external devices. In one embodiment, the system I/O module 180 may couple the illustrated system 100 to a local area network (LAN) or to a wide area network (WAN) or to other external data transceiving and processing means and electromagnetic, instructing signals for causing system 100 to perform in accordance with the above described procedures may come in by any one or more of such external data transceiving and processing means. Additionally and/or alternatively, the disk subsystem 170 which typically includes a drive (not separately shown) and a nonvolatile data storage medium (e.g., 175) may be used for storing databases such as above-described databases 310/410 and may be used for conveying part or all of the software instructing signals. The data storage medium 175 may be in the form of a magnetic hard disk, or a floppy diskette, or a re-writeable optical disk, or other such non-volatile, randomly accessible, re-writeable media. ROM or Flash EEPROM may be alternatively used in carrying out some or all of the nonvolatile data storing functions of the disk subsystem 170/175. It is understood that the data that is recorded on the disk subsystem 170/175 may be brought into subsystem 170 or into system memory 160 through a variety of data conveying means including but not limited to: floppy diskettes, compact-disks (CD ROM), tape, and over-a-network downloading by a file server computer or the like.

Given the above disclosure of general concepts and specific embodiments, the scope of protection sought is to be defined by the claims appended hereto.

What is claimed is:

1. A machine system for automatically saving work product of frozen and subsequently revived application programs, said machine system comprising:
   (a) first means for identifying one or more windows of a frozen and subsequently revived application program which, based on one or more rules, contain vital data in need of saving; and
   (b) second means, operatively coupled to and responsive to the first means, for instructing one or more of said identified windows to automatically save their contained data.

2. The machine system of claim 1 wherein said first means includes:
   (a.1) a database having a plurality of criteria satisfaction records, where each said criteria satisfaction record defines at least one of:
      (a.1a) a parent/child hierarchy relationship between a vital data-containing window and other windows of a respective one or more application programs, and
      (a.1b) a child to name of containing program relationship between a vital data-containing window and a respective one or more application programs.

3. The machine system of claim 2 wherein each said criteria satisfaction record defines at least both of said parent/child hierarchy relationship and said child to name of containing program relationship.

4. The machine system of claim 2 wherein:
   (a.2) each said criteria satisfaction record is further associated with a Save-And-Close message field that identifies a respective Save-And/Or-Close message stream that is to be sent to a corresponding one or more of said identified windows for causing such windows to save their contained data; and
   (b.1) said second means uses the Save-And-Close message field for identifying the Save-And/Or-Close message stream that is to be sent to a corresponding one or more of said identified windows for causing such windows to save their contained data.

5. A machine-implemented method for automatically saving work product of frozen and subsequently revived application programs, said machine-implemented method comprising the steps of:
   (a) identifying one or more windows of a frozen and subsequently revived application program which, based on one or more rules, contain vital data in need of saving; and
   (b) instructing one or more of said identified windows to automatically save their contained data.

6. Data conveying media for conveying database information that is useful for identifying one or more windows of a frozen and subsequently revived application program which, contain vital data in need of saving, where the conveyed database information contains one or more criteria satisfaction records, where each said criteria satisfaction record defines at least one of:
   (a.1a) a parent/child hierarchy relationship between a vital data-containing window and other windows of a respective one or more application programs, and
   (a.1b) a child to name of containing program relationship between a vital data-containing window and a respective one or more application programs;
   wherein a vital data-containing window is a window which, based on one or more rules, contains data in need of automatic saving.

7. An instruction conveying device for conveying machine instructions to a programmable machine, where the conveyed instructions cause said machine to save work product of frozen and subsequently revived application programs by carrying out a saving method comprising the steps of:
   (a) identifying one or more windows of a frozen and subsequently revived application program which, based on one or more rules, contain vital data in need of saving; and
   (b) instructing one or more of said identified windows to automatically save their contained data.

8. An instructing signal for instructing a programmable machine to save work product of frozen and subsequently revived application programs, said instructing signal causing the machine to carry out a saving method comprising the steps of:
   (a) identifying one or more windows of a frozen and subsequently revived application program which, based on one or more rules, contain vital data in need of saving; and
   (b) instructing one or more of said identified windows to automatically save their contained data.

9. A record defining signal for conveying database information that is useful for identifying one or more windows of a frozen and subsequently revived application program which, contain vital data in need of saving, where the record defining signal conveys satisfaction criteria defining at least one of:
   (a.1a) a parent/child hierarchy relationship between a vital data-containing window and other windows of a respective one or more application programs, and
   (a.1b) a child to name of containing program relationship between a vital data-containing window and a respective one or more application programs
   wherein a vital data-containing window is a window which, based on one or more rules, contains data in need of automatic saving.

10. A method for distinctively identifying one or more windows within a windows hierarchy of an application program, said method comprising the steps of:

(a) running said application program;

(b) executing a spy program that can spy on windows of said running application program;

(c) using the spy program to manually identify a window of the application program that contains data to automatically save in the event of a future crash or other freeze of said application program; and (d) formulating one or more rules that enable automated and distinguishing identification of said manually identified window.

11. The identification method of claim 10 and further comprising the step of:

(e) recording the formulated one or more rules in a machine readable, storage medium.

12. A manufactured instructing signal for instructing an instructable machine to save in-progress work of an apparently frozen application program that has been subjected to an automated revival process (which automated revival process can include doing essentially nothing to the apparently frozen application program), the apparently frozen application program being an application program that fails to provide a user observable response to one or more user inputs that would normally produce a user observable response, said manufactured instructing signal causing the machine to carry out an automated saving method comprising:

(a) identifying, among plural open windows of the apparently frozen application program subjected to the automated revival process, a window that has a relatively high probability, in comparison to corresponding other probabilities of others of the plural open windows, of containing vital data representing in-progress work product of the apparently frozen application program, where said vital data is data a user of the program would, based on one or more rules, want to save into a file but may not have yet saved into a file when said application program became apparently frozen; and (b) instructing the identified window to automatically save its contained data.

13. The manufactured instructing signal of claim 12 and wherein:

(a.1) said vital data includes non-replicatable work product.

14. The manufactured instructing signal of claim 12 and wherein:

(a.1) said vital data includes data that had just been captured and/or transformed in real-time.

15. The manufactured instructing signal of claim 12 and wherein:

said subjecting of the apparently frozen application program to an automated revival process includes trying to CLOSE or CANCEL a currently active window of the apparently frozen application program.

16. The manufactured instructing signal of claim 12 and wherein:

said subjecting of the apparently frozen application program to an automated revival process includes entering an execution stream of the apparently frozen application program at a point where continued execution will attempt to preserve the application program's work-product state just before encounter with a freeze-causing event occurred.

17. The manufactured instructing signal of claim 12 and wherein said identifying includes:

(a.1) analyzing a parent/child windows hierarchy relationship present between two or more of said plural open windows of the apparently frozen application program subjected to the automated revival process; and (a.2) consulting a pre-established, hierarchy profiling database to determine if a pre-established navigation profile matches or statistically correlates to a navigation path found for the analyzed ones of said plural open windows of the apparently frozen application program subjected to the automated revival process.

18. The manufactured instructing signal of claim 17 and wherein said identifying further includes:

(a.3) determining the name of the apparently frozen application program subjected to the automated revival process; and (a.4) further consulting the pre-established, hierarchy profiling database to determine if a pre-established navigation profile with a matching navigation path profile further has a program name identifier associated with said database profile where the associated program name identifier corresponds to the determined name of the apparently frozen application program subjected to the automated revival process.

19. The manufactured instructing signal of claim 12 and wherein:

(a.1) said identifying includes using a database that has been constructed for each of multiple programs for identifying where in a windows hierarchy of each of said multiple programs, there will be a window that contains information that an end user would generally consider as being vital data.

20. The manufactured instructing signal of claim 12 and wherein:

(b.1) said instructing of the identified window includes sending a CLOSE message to the identified window.

21. A machine-implemented process which tries to save vital data representing in-progress work product of an apparently frozen application program, where the apparently frozen application program is an application program that fails to provide a user observable response to one or more user inputs that would normally produce a user observable response, said machine-implemented process comprising:

(a) using a pre-defined, windows hierarchy profiling database to make intelligent determinations as to probabilities that a certain one or more open windows, of the apparently frozen application program subjected to a revival process, contains vital-data;

(b) ordering the identified probabilities determined in step (a); and (c) successively instructing the identified, open windows to automatically save their data, where said succession proceeds through candidate windows in accordance with the ordering established in step (b), where said vital data is data a user of the apparently frozen application program would, based on one or more rules, want to save into a file but may not have yet saved into a file when said application program became apparently frozen.

22. A machine-implemented method for assisting a computer user in preserving unsaved work-product of an apparently frozen application program, the apparently frozen application program being an application program that fails to provide a user observable response to one or more user inputs that would normally produce a user observable response, said machine-implemented assisting method comprising:

(a) providing the user with a choice of attempting to revive the apparently frozen program with or without an accompanying, automated attempt to save the unsaved work-product;

(b) if the user chooses to attempt a revival with the accompanying attempt to save the unsaved work-product:

(b.1) performing an automated revival attempt;

(b.2) if said automated revival attempt appears to have been successful, identifying one or more open windows of the apparently frozen application program subjected to said automated revival attempt which contain vital-data, where said vital data is data an average user of the application program would, based on one or more rules, want to save into a file if it had not yet been saved into a file when said application program became apparently frozen;

(b.3) starting with a window identified in step (b.2) as having a higher probability of containing vital data, successively instructing the identified, open windows of the apparently frozen application program subjected to said automated revival attempt, to automatically save their data, where said succession proceeds from candidate windows with higher probabilities of containing vital data to candidate windows with lower probabilities of containing vital data.

23. The machine-implemented assisting method of claim 22 and further comprising:

(c) while step (b.3) is trying to successively cause each window that has vital data to save its vital data, preventing the user from gaining intervening control over the apparently frozen application program by automatically responding to intervening dialog inquiries so as to continue a windows-saving operation to completion.

24. The machine-implemented assisting method of claim 22 and further comprising:

(c) while step (b.3) is trying to successively cause each window that has vital data to save its vital data, preventing the user from gaining intervening control over the apparently frozen application program subjected to said automated revival attempt by waiting for each window that has vital data to finish saving its vital data and to thereafter close, and during said waiting, automatically detecting further apparent freezes of the application program and automatically performing further automated revival attempts on the further frozen program so that the window which is being instructed to save its own vital data can complete the save and close down sequence.

25. The machine-implemented assisting method of claim 22 and further comprising:

(c) after said step (b.3) of trying to successively cause each window that has vital data to save its vital data completes:

(c.1) shutting down the apparently frozen application program subjected to said automated revival attempt;

(c.2) re-launching a fresh copy of the shut down application program; and (c.3) automatically loading into the re-launched application program, the vital data that had been saved in step (b.3).

26. A machine system for automatically saving work product of frozen and subsequently revived application programs, said machine system comprising:

(a) first means for using pre-established satisfaction rules to identify one or more windows of a frozen and subsequently revived application program which contain vital data worthy of saving; and (b) second means, operatively coupled to and responsive to the first means, for instructing one or more of said identified windows to automatically save their contained data.

* * * * *

UNITED STATES PATENT AND TRADEMARK OFFICE
CERTIFICATE OF CORRECTION

PATENT NO.     : 6,630,946 B2                                   Page 1 of 1
DATED          : October 7, 2003
INVENTOR(S)    : Scott C. Elliott and K. Jeffrey Percy Carr It is certified that error appears in the above-identified patent and that said Letters Patent is hereby corrected as shown below:

<u>Column 24,</u>
Line 12, after "which", please delete ",".
Line 52, after "which", please delete ",".

Signed and Sealed this

Twenty-third Day of December, 2003

JAMES E. ROGAN
*Director of the United States Patent and Trademark Office*